(12) United States Patent
Ng

(10) Patent No.: US 12,454,330 B2
(45) Date of Patent: Oct. 28, 2025

(54) OPERATING DEVICE FOR HUMAN-POWERED VEHICLE

(71) Applicant: Shimano Inc., Osaka (JP)

(72) Inventor: Jun Wen Ng, Jurong Town (SG)

(73) Assignee: Shimano Inc., Osaka (JP)

( * ) Notice: Subject to any disclaimer, the term of this patent is extended or adjusted under 35 U.S.C. 154(b) by 2 days.

(21) Appl. No.: 18/211,406

(22) Filed: Jun. 19, 2023

(65) Prior Publication Data

US 2024/0417024 A1    Dec. 19, 2024

(51) Int. Cl.
B62K 23/04 (2006.01)
B62K 21/26 (2006.01)
B62M 25/04 (2006.01)

(52) U.S. Cl.
CPC .............. B62K 23/04 (2013.01); B62K 21/26 (2013.01); *B62M 25/04* (2013.01)

(58) Field of Classification Search
CPC ......... B62K 23/04; B62K 21/26; B62M 25/04
See application file for complete search history.

(56) References Cited

U.S. PATENT DOCUMENTS

| | | | |
|---|---|---|---|
| 5,662,000 A * | 9/1997 | Patterson | B62K 21/26 74/473.26 |
| 6,718,844 B2 | 4/2004 | Hanatani | |
| 6,829,963 B2 | 12/2004 | Liao | |
| 6,877,393 B2 | 4/2005 | Takachi | |
| 7,290,462 B2 | 11/2007 | Hou | |
| 7,373,854 B2 | 5/2008 | Chen | |
| 8,096,208 B2 | 1/2012 | Sean | |
| 2004/0261560 A1 * | 12/2004 | Tsai | B62K 23/04 74/473.25 |
| 2009/0065491 A1 * | 3/2009 | Fitzgerald | B62J 33/00 219/204 |
| 2010/0071450 A1 * | 3/2010 | Tanaka | B62K 23/04 73/114.36 |
| 2011/0088504 A1 | 4/2011 | Cheng | |

* cited by examiner

*Primary Examiner* — Minnah L Seoh
*Assistant Examiner* — Gregory T Prather
(74) *Attorney, Agent, or Firm* — Global IP Counselors LLP; David Tarnoff

(57) ABSTRACT

An operating device is provided for a human-powered vehicle. The operating device basically includes a base member, an operating member and a biasing member. The base member is configured to be provided to a handlebar and having a center axis defining an axial direction and a radial direction. The operating member is configured to rotate relative to the base member about the center axis. The biasing member biases the operating member in a direction that is non-perpendicular to the axial direction. The operating member includes a plurality of positioning abutments. The biasing member is configured to selectively engage the positioning abutments.

24 Claims, 18 Drawing Sheets

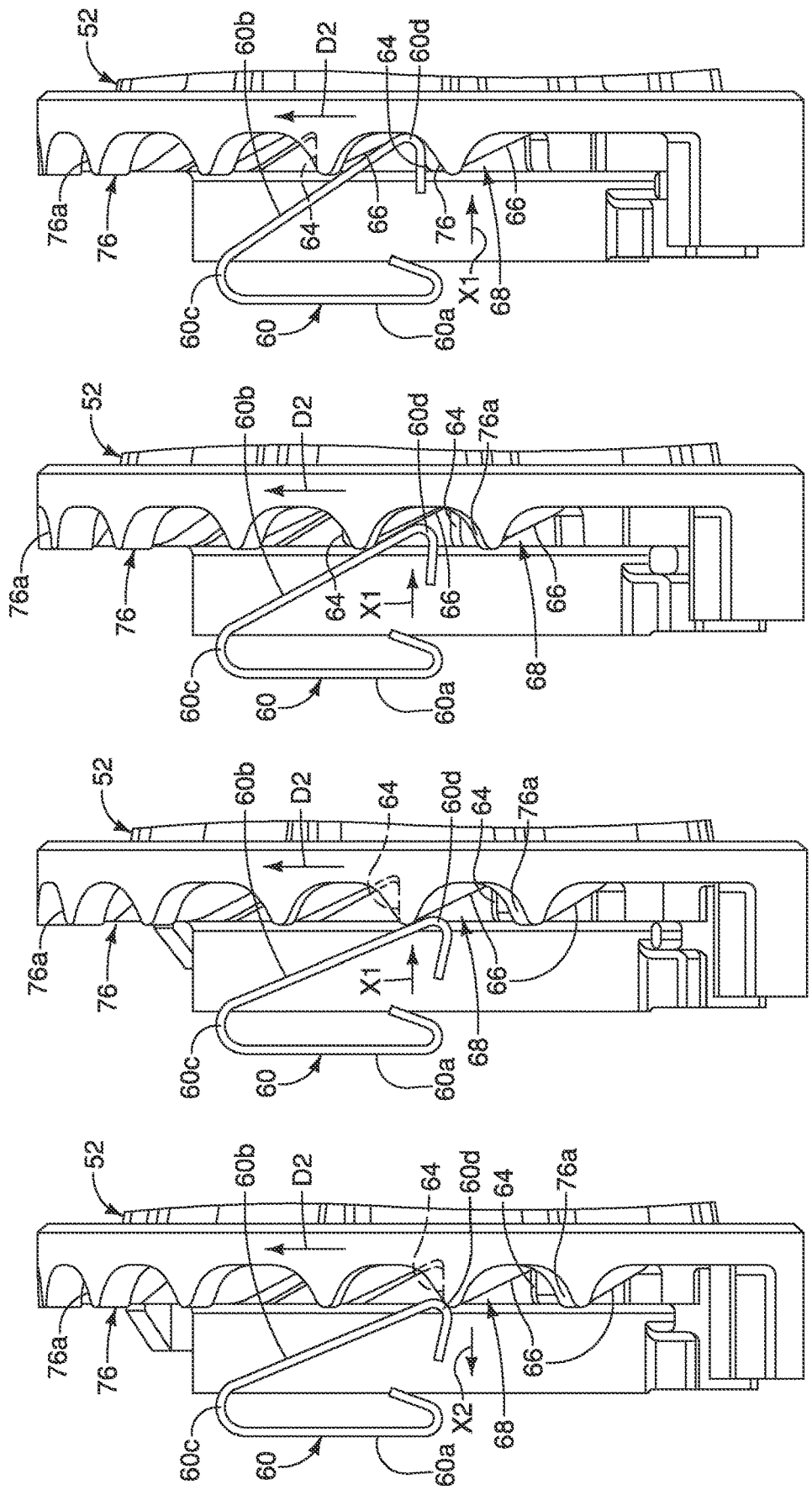

OPERATING DEVICE FOR HUMAN-POWERED VEHICLE

BACKGROUND

Technical Field

This disclosure generally relates to an operating device for a human-powered vehicle.

Background Information

Bicycles are typically provided with one or more bicycle operating devices for operating one or more bicycle components. Examples of some of these bicycle components include a gear changing device (e.g., a derailleur or an internally geared hub), a suspension and a seatpost. A bicycle operating device is usually provided on a bicycle in a location (e.g., on a bicycle handlebar) for a rider to easily operate the bicycle operating device. The bicycle operating device is often connected to the bicycle component with, for example, a Bowden-type control cable.

SUMMARY

Generally, the present disclosure is directed to various features of an operating device for a human-powered vehicle. The term "human-powered vehicle" as used herein refers to a vehicle that can be propelled by at least human driving force to produce propulsion, but does not include a vehicle using only a driving power other than human power. In particular, a vehicle solely using an internal combustion engine as a driving power is not included in the human-powered vehicle. The human-powered vehicle is generally assumed to be a compact, light vehicle that sometimes does not require a license for driving on a public road. The number of wheels on the human-powered vehicle is not limited. The human-powered vehicle includes, for example, a monocycle and a vehicle having three or more wheels. The human-powered vehicle includes, for example, various types of bicycles such as a mountain bike, a road bike, a city bike, a cargo bike, and a recumbent bike, and an electric assist bicycle (E-bike).

In view of the state of the known technology and in accordance with a first aspect of the present disclosure, an operating device is provided for a human-powered vehicle. The operating device basically comprises a base member, an operating member and a biasing member. The base member is configured to be provided to a handlebar and having a center axis defining an axial direction and a radial direction. The operating member is configured to rotate relative to the base member about the center axis. The biasing member biases the operating member in a direction that is non-perpendicular to the axial direction. The operating member includes a plurality of positioning abutments. The biasing member is configured to selectively engage the positioning abutments.

With the operating device according to the first aspect, the operating device can be relatively more compact in the radial direction and/or the axial direction.

In accordance with a second aspect of the present disclosure, the operating device according to the first aspect is configured so that the biasing member is attached to the base member.

With the operating device according to the second aspect, the biasing member can be easily provided in the operating device and the assembly process can be more easily performed.

In accordance with a third aspect of the present disclosure, the operating device according to the first aspect or the second aspect is configured so that the base member includes a first axial abutment and a second axial abutment. The operating member is axially disposed between the first axial abutment and the second axial abutment to restrict axial movement of the operating member relative to the base member.

With the operating device according to the third aspect, movement of the operating member can be reliably restricted in the axial direction relative to the base member.

In accordance with a fourth aspect of the present disclosure, the operating device according to the third aspect is configured so that the operating member includes a first contact surface configured to contact the first axial abutment. The first axial abutment includes an annular surface and the first contact surface annularly contacts the first axial abutment.

With the operating device according to the fourth aspect, the first contact surface of the operating member can firmly contact the first axial abutment of the base member.

In accordance with a fifth aspect of the present disclosure, the operating device according to the fourth aspect is configured so that the first axial abutment includes an annular surface and the first contact surface intermittently contacts the first axial abutment.

With the operating device according to the fifth aspect, the amount of contact between the first contact surface of the operating member and the first axial abutment of the base member can be reduced, and thus, the operating member can be more easily rotated.

In accordance with a sixth aspect of the present disclosure, the operating device according to the fourth aspect or the fifth aspect is configured so that the first axial abutment includes an annular surface and the first contact surface contacts less than 360 degrees of the annular surface of the first axial abutment.

With the operating device according to the sixth aspect, the amount of contact between the first contact surface of the operating member and the first axial abutment of the base member can be reduced, and thus, the operating member can be more easily rotated.

In accordance with a seventh aspect of the present disclosure, the operating device according to the fourth aspect or the fifth aspect is configured so that at least one of the first axial abutment and the first contact surface includes a wave shape.

With the operating device according to the seventh aspect, the amount of contact between the first contact surface of the operating member and the first axial abutment of the base member can be reduced, and thus, the operating member can be more easily rotated.

In accordance with an eighth aspect of the present disclosure, the operating device according to any one of the first aspect to the seventh aspect is configured so that the base member includes a first base portion and a second base portion attached to the first base portion.

With the operating device according to the eighth aspect, the base member can be more easily constructed, and the operating member can be more easily coupled to the base member.

In accordance with a ninth aspect of the present disclosure, the operating device according to the eighth aspect is configured so that the first base portion includes a tubular part rotatably supporting the operating member.

With the operating device according to the ninth aspect, the operating member can be easily and reliably rotated relative to the base member.

In accordance with a tenth aspect of the present disclosure, the operating device according to the eighth aspect or the ninth aspect is configured so that the first base portion includes a first axial abutment and the second base portion includes a second axial abutment. The operating member is axially disposed between the first axial abutment and the second axial abutment to restrict axial movement of the operating member relative to the base member.

With the operating device according to the tenth aspect, movement of the operating member can be reliably restricted in the axial direction relative to the base member.

In accordance with an eleventh aspect of the present disclosure, the operating device according to any one of the eighth aspect to the tenth aspect is configured so that the first base portion is attached to the second base portion by a snap-fit connection.

With the operating device according to the eleventh aspect, the first base portion can be easily attached to the second base portion.

In accordance with a twelfth aspect of the present disclosure, the operating device according to any one of the eighth aspect to the eleventh aspect is configured so that the second base portion includes a cable adjuster.

With the operating device according to the twelfth aspect, the tension in the cable can be adjusted as needed and/or desired.

In accordance with a thirteenth aspect of the present disclosure, the operating device according to any one of the first aspect to the twelfth aspect is configured so that the operating member includes a rotating body and a grip body.

With the operating device according to the thirteenth aspect, the operating member can be more easily constructed, and coupled to the base member.

In accordance with a fourteenth aspect of the present disclosure, the operating device according to the thirteenth aspect is configured so that the operating member further includes a hand grip constructed of an elastomeric material.

With the operating device according to the fourteenth aspect, the operating member can be more comfortable to grip.

In accordance with a fifteenth aspect of the present disclosure, the operating device according to the thirteenth aspect or the fourteenth aspect is configured so that the rotating body includes a cable attachment structure.

With the operating device according to the fifteenth aspect, the operating device can be used to operate a remotely located component using a cable.

In accordance with a sixteenth aspect of the present disclosure, the operating device according to any one of the thirteenth aspect to the fifteenth aspect is configured so that the rotating body and the grip body are configured to move together in response to the operating member being moved in a first operating direction about the center axis.

With the operating device according to the sixteenth aspect, rotation of the grip body can be reliably transmitted from the grip body to the rotating body when the grip body is moved in the first operating direction about the center axis.

In accordance with a seventeenth aspect of the present disclosure, the operating device according to the sixteenth aspect is configured so that the grip body is configured to move relative the rotating body in response to the operating member being moved in a second operating direction about the center axis where the second operating direction is opposite the first operating direction.

With the operating device according to the seventeenth aspect, inadvertent movement of the rotating body is prevented when the grip body is inadvertently moved a small amount in the second operating direction about the center axis.

In accordance with an eighteenth aspect of the present disclosure, the operating device according to the seventeenth aspect is configured so that the operating member includes an additional biasing member disposed between the grip body and the rotating body to bias the rotating body in the second operating direction relative to the grip body.

With the operating device according to the eighteenth aspect, the grip body can be reliably maintained in a ready position to rotate the rotating body in the first operating direction about the center axis.

In accordance with a nineteenth aspect of the present disclosure, the operating device according to the seventeenth aspect or the eighteenth aspect is configured so that the additional biasing member is a compression spring.

With the operating device according to the nineteenth aspect, the relative position between the grip and the rotating body can be easily maintained using a compression spring.

In accordance with a twentieth aspect of the present disclosure, the operating device according to the eighteenth aspect or the nineteenth aspect is configured so that the rotating body includes a first stop surface, and the grip body includes a second stop surface. The additional biasing member biases the rotating body so as to bring the first stop surface into contact with the second stop surface in a state where the operating member is in a rest position.

With the operating device according to the twentieth aspect, the relative position between the grip and the rotating body can be reliably established.

In accordance with a twenty-first aspect of the present disclosure, the operating device according to any one of the seventeenth aspect to the twentieth aspect is configured so that the positioning abutments are circumferentially arranged on the rotating body with respect to the center axis. The grip body includes a release profile configured to deflect the biasing member in the axial direction for disengaging the biasing member from the positioning abutments during relative movement of the grip body relative the rotating body in response to the grip body being moved in the second operating direction.

With the operating device according to the twenty-first aspect, a user can easily and reliably shift the operating device between a plurality of positions.

In accordance with a twenty-second aspect of the present disclosure, the operating device according to any one of the first aspect to the twenty-first aspect is configured so that the biasing member is a leaf spring having a detent portion configured to selectively engage the positioning abutments.

With the operating device according to the twenty-second aspect, the biasing member can provide an axially directed biasing force and can maintain the rotating body in one the predetermined positions.

In accordance with a twenty-third aspect of the present disclosure, the operating device according to any one of the first aspect to the twenty-second aspect is configured so that the base member includes a handlebar mounting structure.

With the operating device according to the twenty-third aspect, the operating device can be mounted to a handlebar such that the operating device can be easily operated by a user gipping the handlebar.

Also, other objects, features, aspects and advantages of the disclosed operating device will become apparent to those skilled in the art from the following detailed description, which, taken in conjunction with the annexed drawings, discloses preferred embodiments of the operating device.

BRIEF DESCRIPTION OF THE DRAWINGS

Referring now to the attached drawings which form a part of this original disclosure.

FIG. 20 is a partial side elevational view, similar to FIGS. 17 to 19, of the biasing member, the grip body and the rotating body, but in which the grip body has been rotated further relative to the rotating body from the position of FIG. 19 in the second operating direction in performing the cable releasing operation.

FIG. 21 is a partial side elevational view, similar to FIGS. 17 to 20, of the biasing member, the grip body and the rotating body, but in which the grip body has been rotated further relative to the rotating body from the position of FIG. 20 in the second operating direction in performing the cable releasing operation.

FIG. 22 is a partial side elevational view, similar to FIGS. 17 to 21, of the biasing member, the grip body and the rotating body, but in which the grip body has been rotated further relative to the rotating body from the position of FIG. 21 in the second operating direction in performing the cable releasing operation.

FIG. 23 is a partial side elevational view, similar to FIGS. 17 to 22, of the biasing member, the grip body and the rotating body, but in which the grip body has been rotated further relative to the rotating body from the position of FIG. 21 in the second operating direction and the rotating body moves in the first operating direction to complete the cable releasing operation.

DETAILED DESCRIPTION

Selected embodiments will now be explained with reference to the drawings. It will be apparent to those skilled in the human-powered vehicle field (e.g., the bicycle field) from this disclosure that the following descriptions of the embodiments are provided for illustration only and not for the purpose of limiting the invention as defined by the appended claims and their equivalents.

Referring initially to FIGS. 1 to 6, an operating device 10 is illustrated in accordance with one illustrated embodiment. The operating device 10 is to be provided to a human-powered vehicle V. The operating device 10 is configured to be mounted to a handlebar H so as to be operated by a user. The operating device 10 is configured to be operatively coupled to a human-powered vehicle component VC. The operating device 10 is particularly configured to be used with a human-powered vehicle that has a flat style handlebar. For example, in illustrated embodiment, the human-powered vehicle V is a bicycle.

Figure 1:
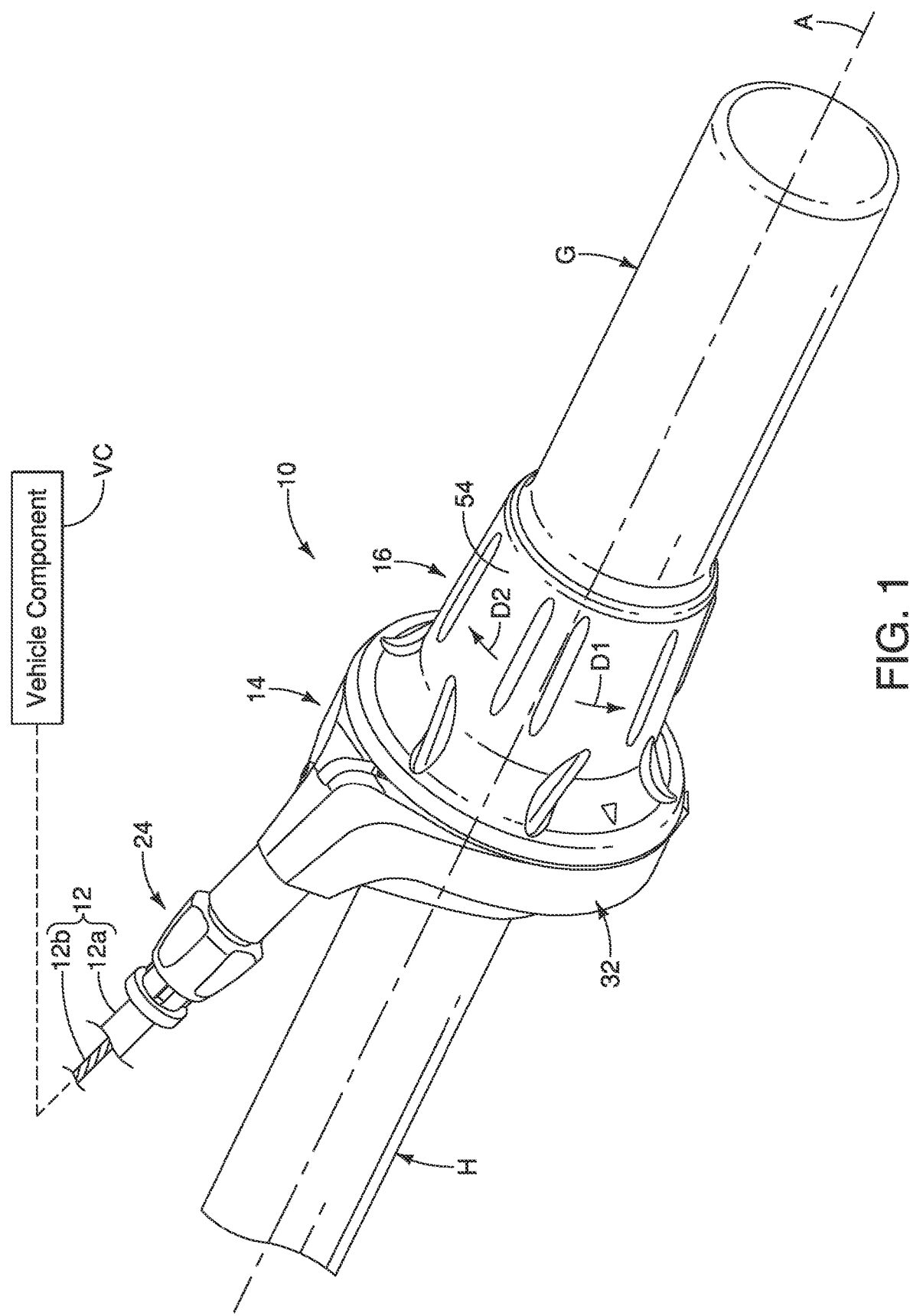
FIG. 1 is a perspective view of a portion of a handlebar of a human-powered vehicle (e.g., a bicycle) equipped with an operating device in accordance with a first embodiment.
Figure 2:
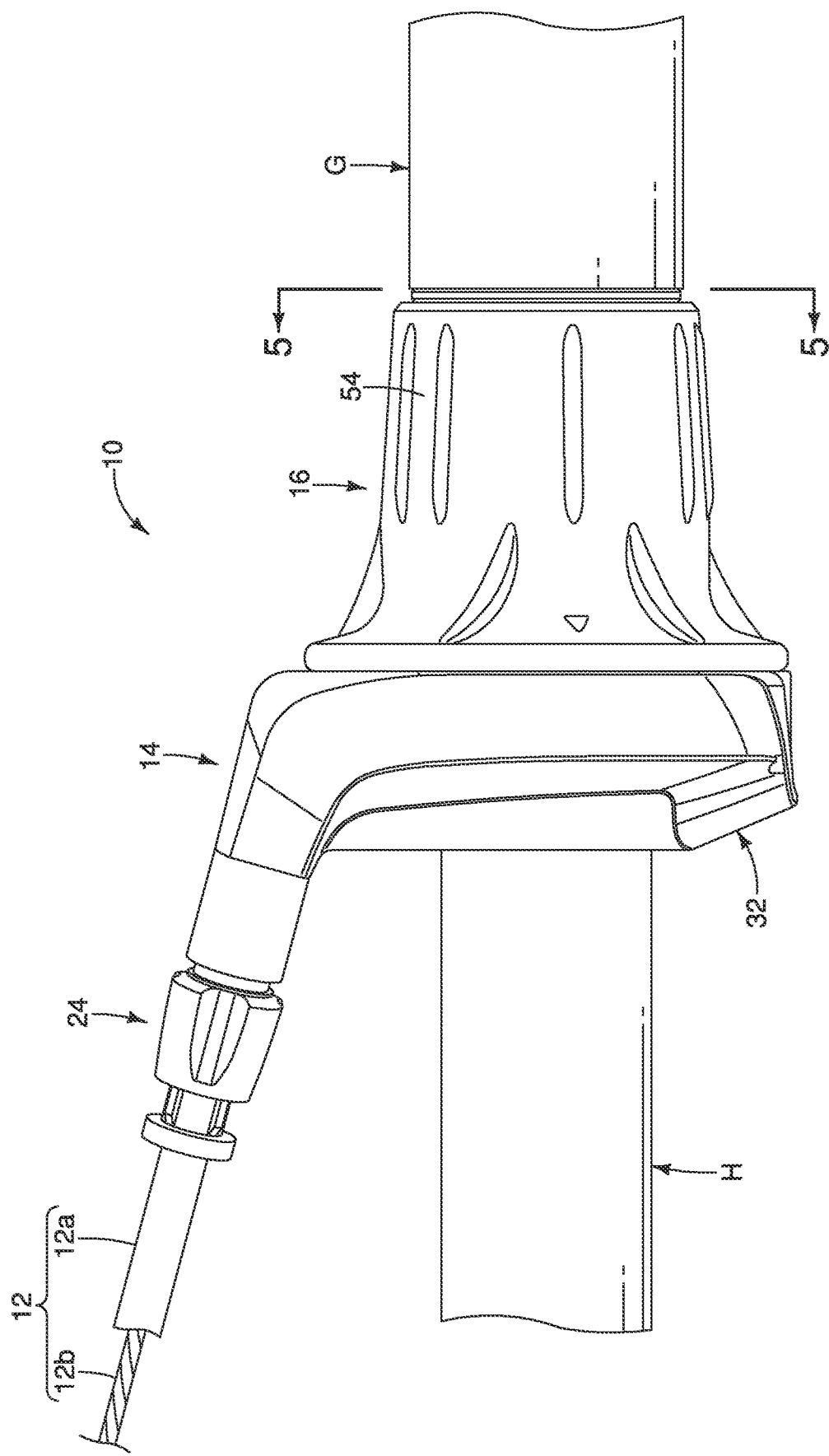
FIG. 2 is an enlarged top view of a portion of the handlebar and the operating device illustrated in FIG. 1.
Figure 3:
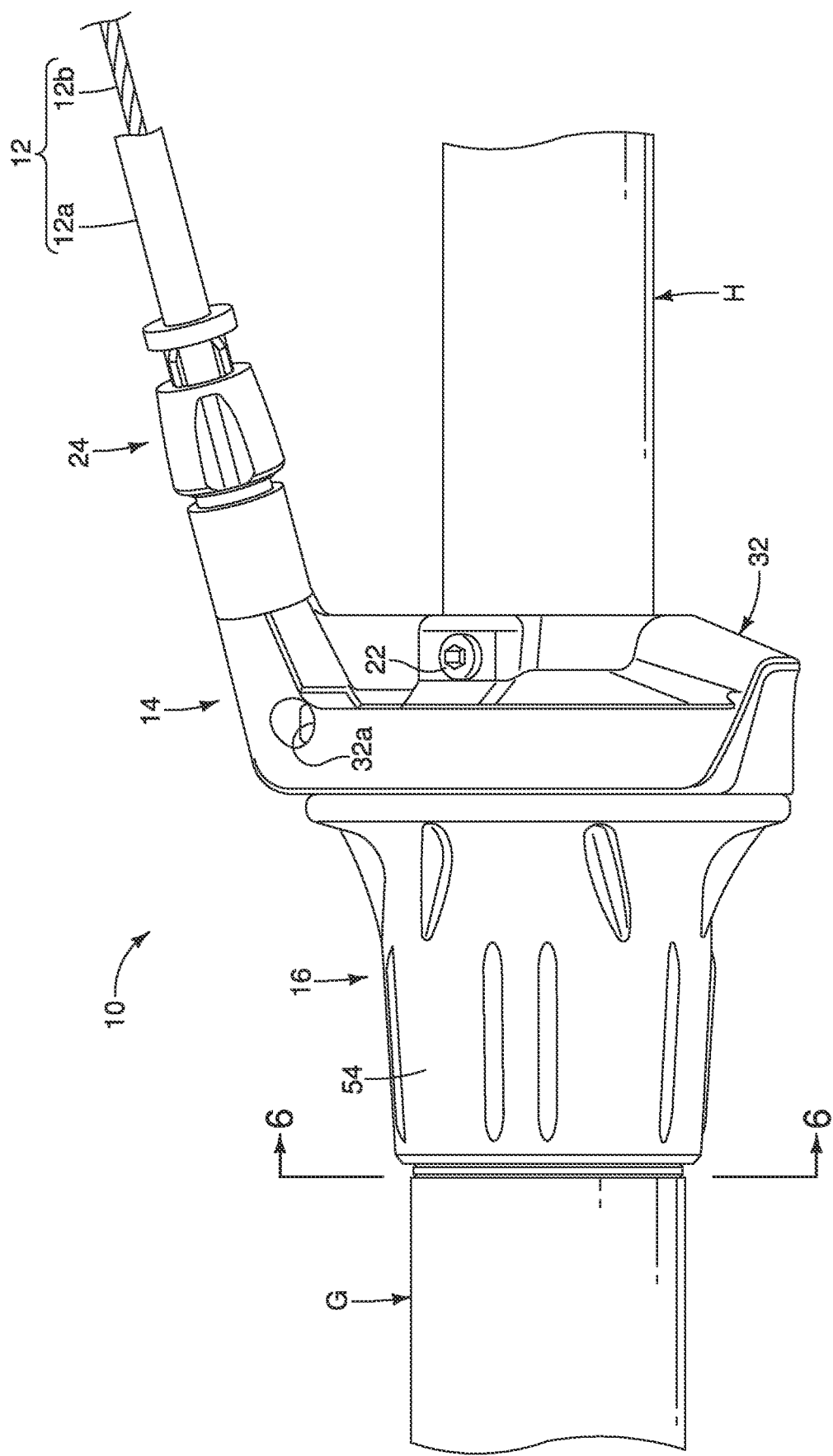
FIG. 3 is an enlarged bottom view of a portion of the handlebar and the operating device illustrated in FIGS. 1 and 2.
Figure 4:
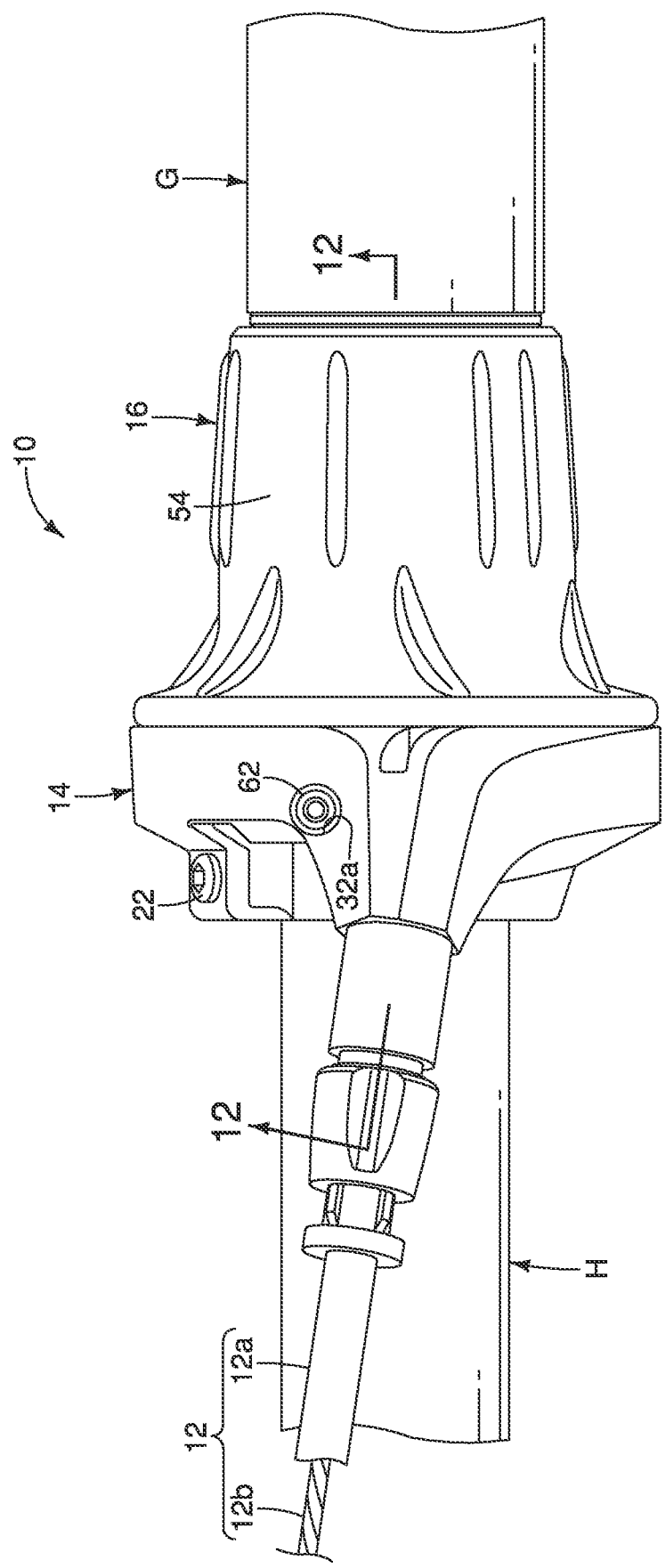
FIG. 4 is an enlarged front view of a portion of the handlebar and the operating device illustrated in FIGS. 1 to 3.

In the illustrated embodiment, as seen in FIG. 1, the operating device 10 is configured to be operatively coupled to the human-powered vehicle component VC via a control cable 12. Preferably, as seen in FIG. 1, the control cable 12 is a conventional bicycle operating cable that has an outer case 12a covering an inner wire 12b. In other words, the control cable 12 is a Bowden type cable in which the inner wire 12b is slidably received within the outer case 12a. The operating device 10 operates the human-powered vehicle component VC by selectively pulling and releasing the inner wire 12b. However, the operating device 10 can be configured to operate one or more electric switches to operate an electric vehicle component.

In the case where the human-powered vehicle V is a bicycle, the operating device 10 is configured as a shifter for controlling the gear positions of a transmission device such as a derailleur or an internal gear hub. However, the operating device 10 can be configured as a bicycle operating device for operating other types of components (e.g., suspension devices, seatposts, etc.) as needed and/or desired. In the illustrated embodiment, as explained below, the operating device 10 has a plurality of predetermined positions or steps. When the human-powered vehicle component VC is a rear derailleur, the predetermined positions or steps of the operating device 10 correspond to gear positions of a rear transmission device (e.g., a rear derailleur or a rear internal gear hub).

As seen in FIGS. 1 to 6, the operating device 10 basically comprises a base member 14 and an operating member 16. Here, the base member 14 is configured to be provided to the handlebar H. The base member 14 has a center axis A defining an axial direction X and a radial direction Y. The center axis A of the base member 14 substantially coincides with a center longitudinal axis of the handlebar H in a state where the operating device 10 is mounted to the handlebar H. The operating member 16 is configured to rotate relative to the base member 14 about the center axis A. In other words, the operating member 16 is also configured to rotate around the handlebar H. Here, as seen in FIG. 1, the handlebar H has a handgrip G provided to the an outer end of the handlebar H. The operating device 10 is preferably disposed adjacent an inner end of the handgrip G.

Figure 6:
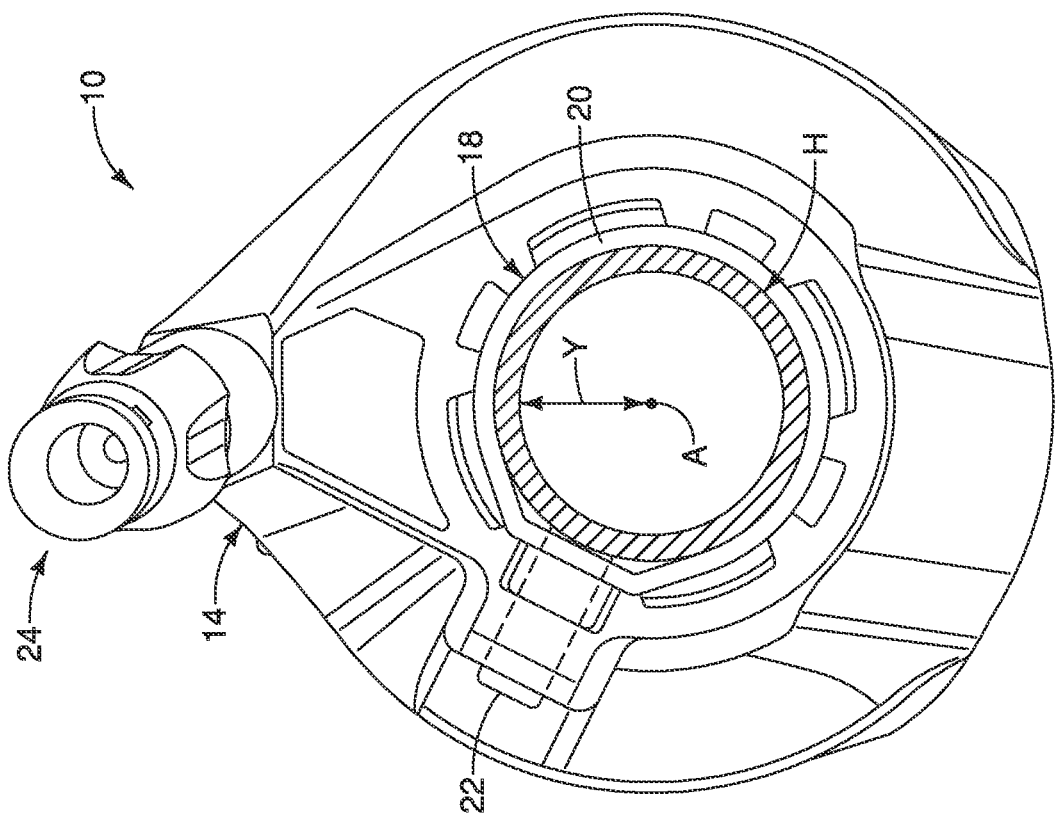
FIG. 6 is an inside end view a portion of the handlebar and the operating device illustrated in FIGS. 1 to 4 as view along section line 6-6 of FIG. 3.
Figure 5:
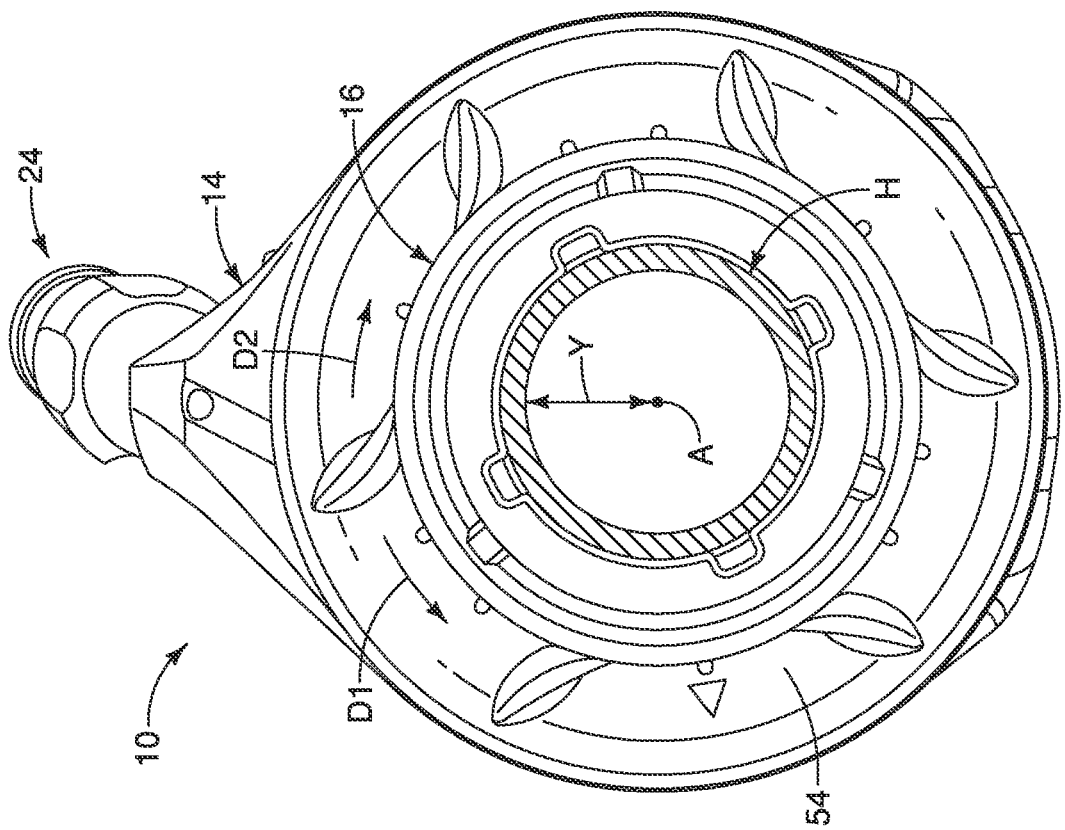
FIG. 5 is an outside end view a portion of the handlebar and the operating device illustrated in FIGS. 1 to 4 as view along section line 5-5 of FIG. 2.
Figure 7:
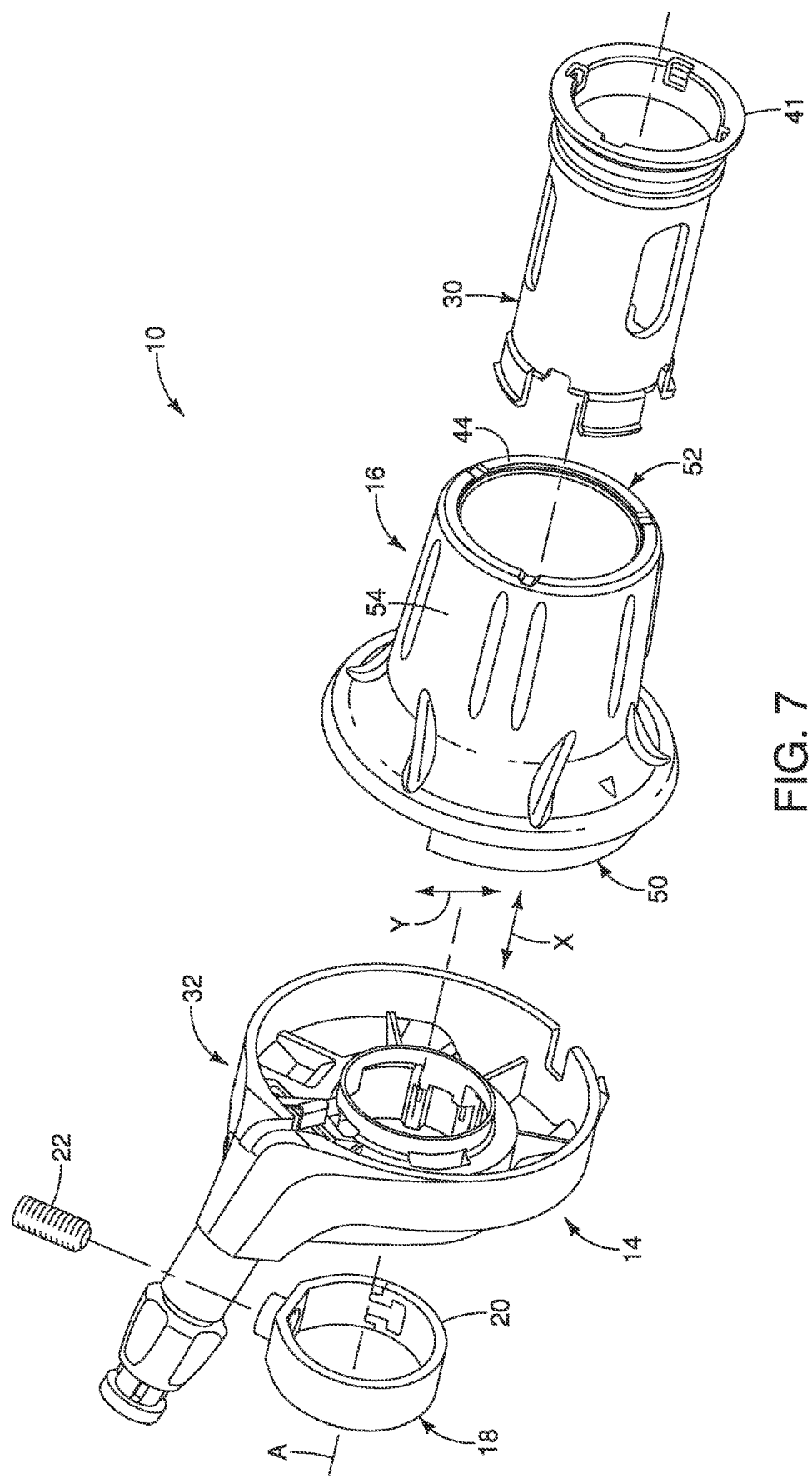
FIG. 7 is a first partially exploded view of the operating device illustrated in FIGS. 1 to 6.
Figure 8:
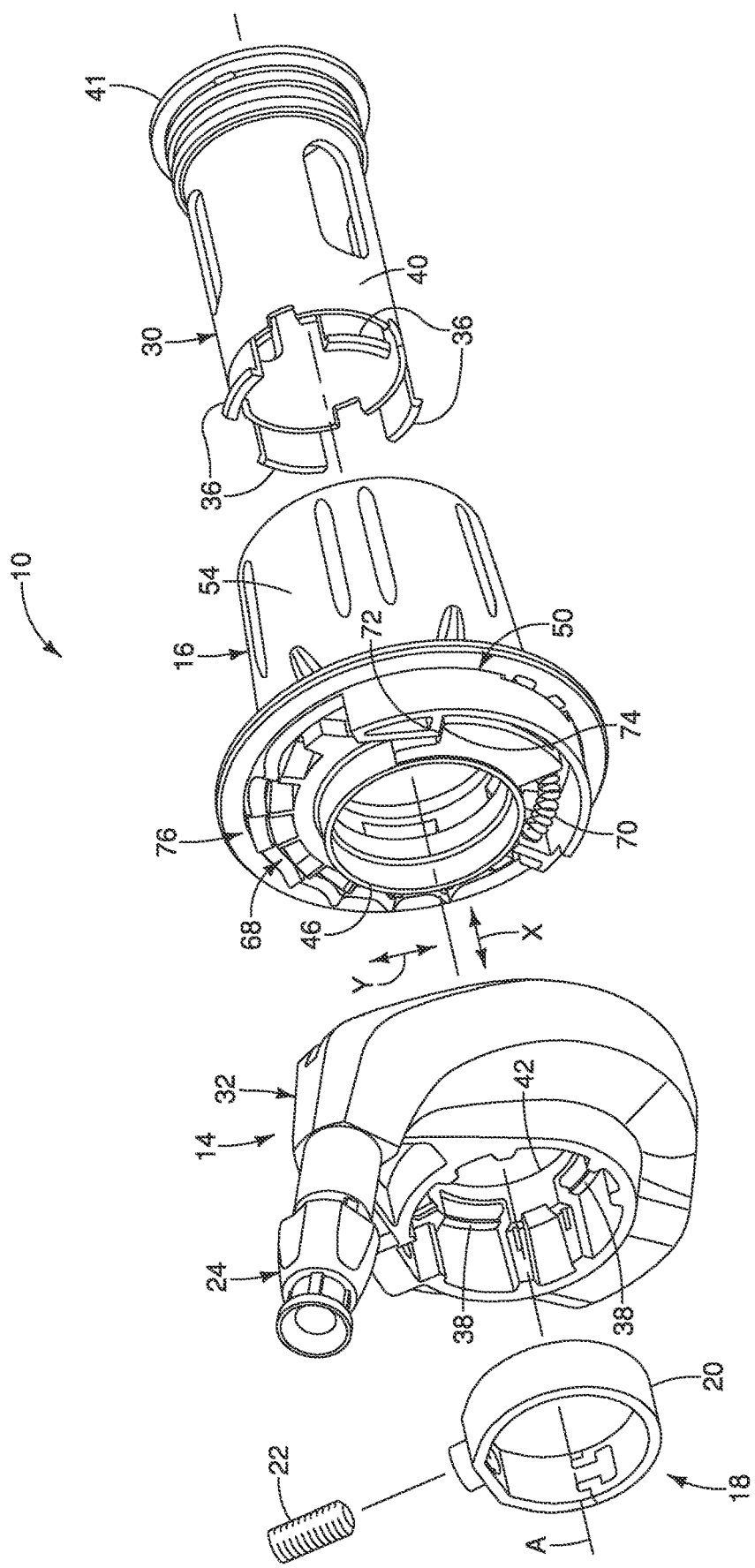
FIG. 8 is a second partially exploded view of the operating device illustrated in FIGS. 1 to 7.
Figure 9:
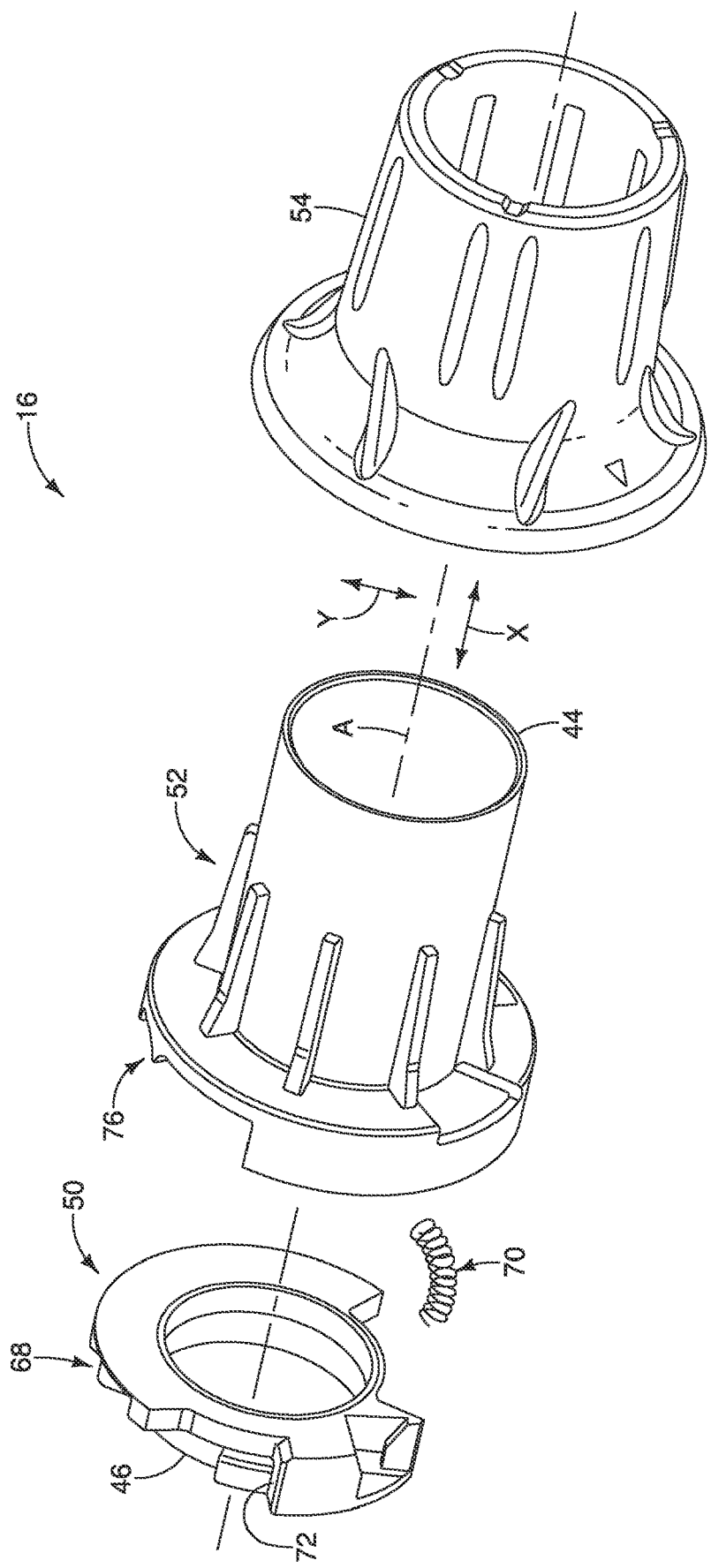
FIG. 9 is a first exploded view of the base member of the operating device illustrated in FIGS. 1 to 7.
Figure 10:
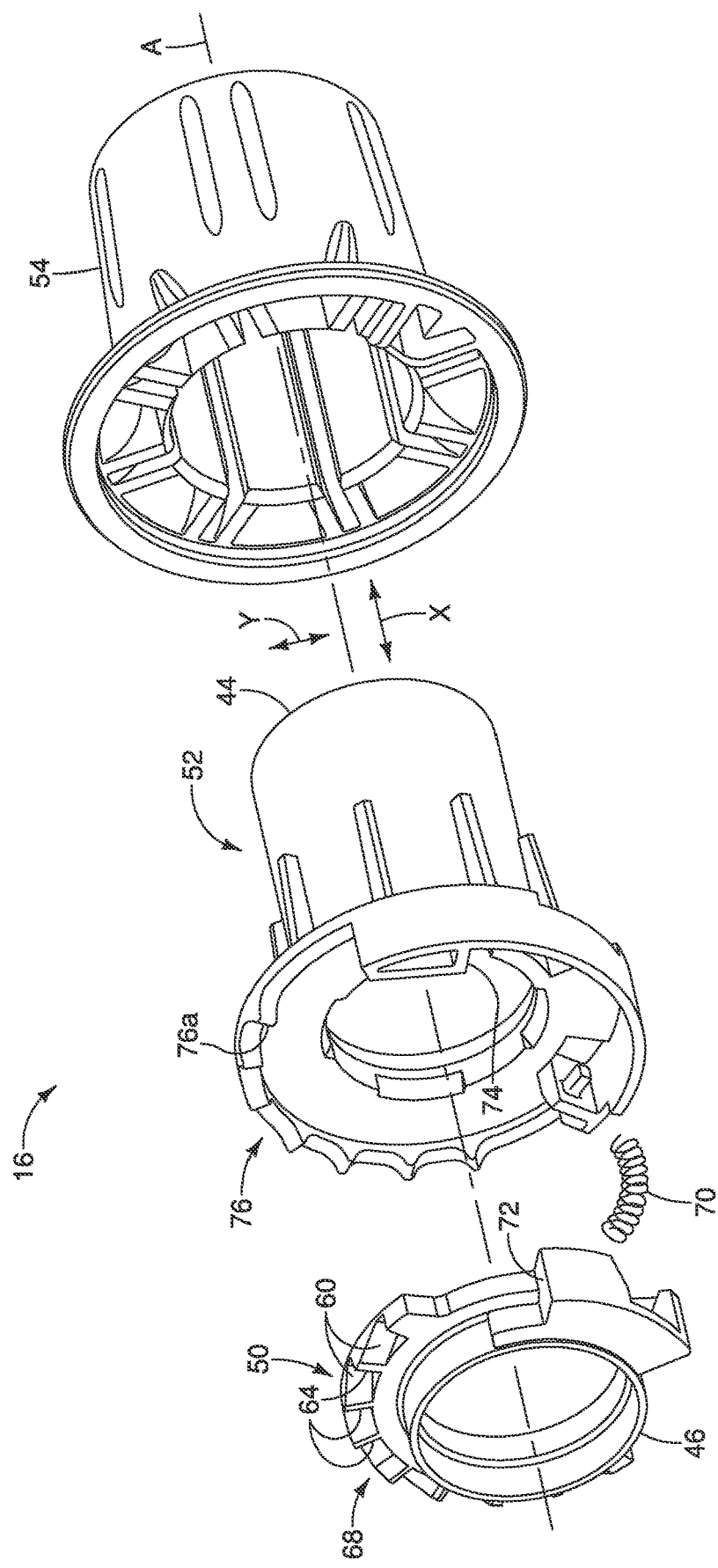
FIG. 10 is a second exploded view of the base member of the operating device illustrated in FIG. 9.
Figure 11:
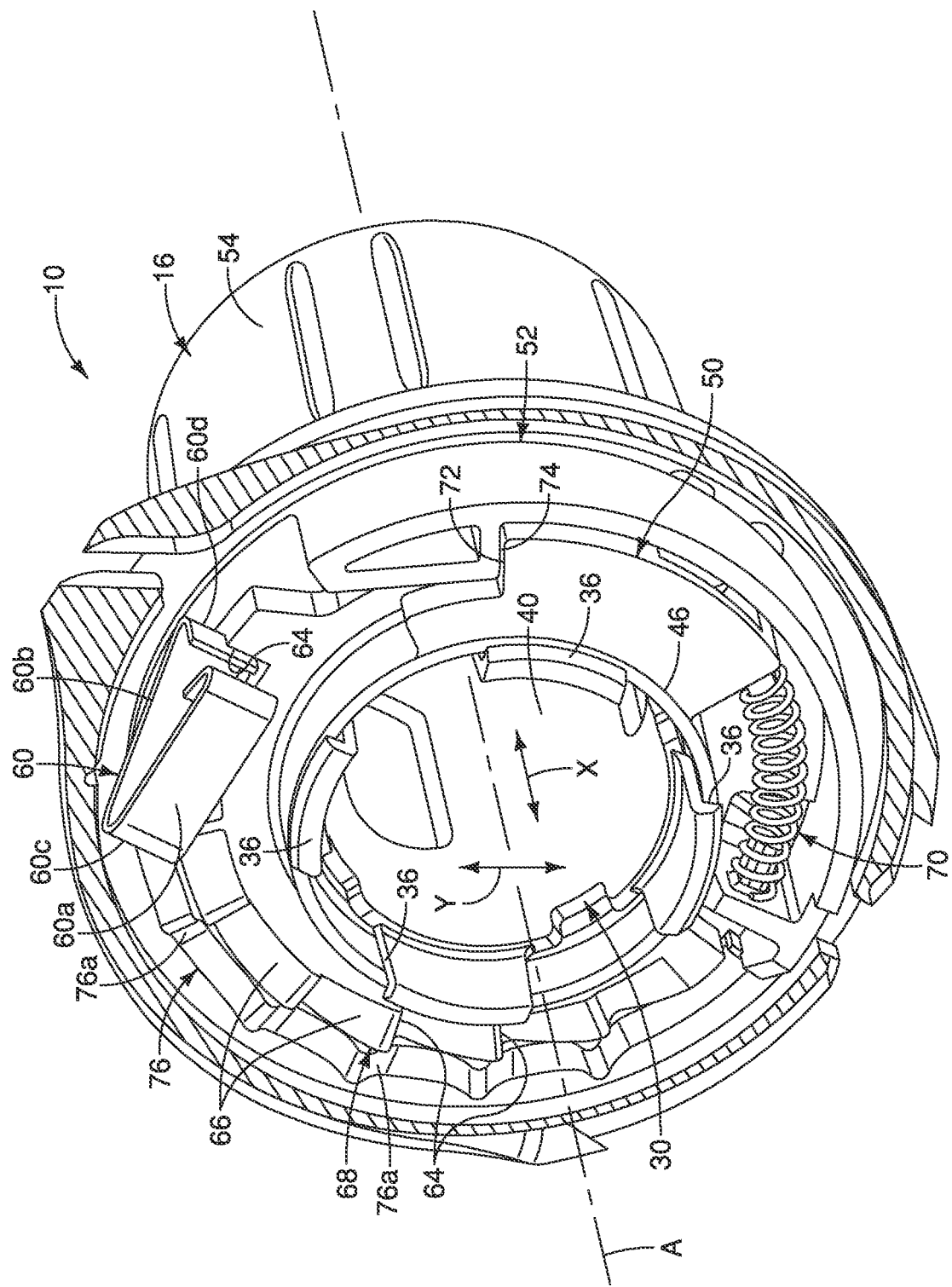
FIG. 11 is a perspective view of the biasing member and the base member of the operating device illustrated in FIGS. 1 to 7.

As seen in FIG. 6, the base member 14 includes a handlebar mounting structure 18. The handlebar mounting structure 18 is a conventional tube clamp that constitutes an example of a handlebar mounting member. Here, the handlebar mounting structure 18 includes a tube part 20 and a fixing bolt 22. The fixing bolt 22 is screwed into a threaded hole of the tube part 20 so that the fixing bolt 22 can be tightened down to contact the handlebar H and pull the tube part 20 against the handlebar H. In this way, the handlebar mounting structure 18 is fixed to the handlebar H. Here, the tube part 20 is also coupled to the base member 14 by the fixing bolt 22. Thus, the base member 14 is fixed to the handlebar H via the handlebar mounting structure 18. The tube part 20 is preferably made of a strong rigid material such as a metallic material or a reinforced resin material. While the tube part 20 is shown as a one-piece, unitary member, the tube part 20 can be made of several parts. Also, instead of the handlebar mounting structure 18, other tube clamps can be used that are configured to secure the base member 14 onto the handlebar H.

As seen in FIG. 1, here, the operating device 10 is configured to be arranged, for example, on a right side of the handlebar H by the handlebar mounting structure 18 so that the operating member 16 can be operated by a rider's right hand. Alternatively, the operating device 10 can be constructed as a mirror image and arranged on a left side of the handlebar H. The handlebar attachment 12 is configured to be mounted to the handlebar H in a conventional manner.

As seen in FIG. 1, here, the operating device 10 further comprises a cable adjuster 24 for adjusting the tension in the inner wire 12b of the control cable 12 in a conventional manner. The cable adjuster 24 is adjustably attached the base member 12. The cable adjuster 24 projects from the base member 14 for receiving the control cable 12. In particular, the cable adjuster 24 is threadedly coupled to the base member 14. The cable adjuster 24 makes small tension changes to the inner wire 12b by increasing or decreasing an effective length of the base member 12. In other words, the cable adjuster 24 is configured to adjust a contact point of an end of the outer case 12a relative to the base member 14 of the operating device 10. The cable adjuster 24 is sometimes called a barrel adjuster. The cable adjuster 24 is a conventional part that is well known in the human-powered vehicle field and will not be discussed in further detail herein.

Here, for example, the base member 14 has a two-piece construction. For example, the base member 14 includes a first base portion 30 and a second base portion 32 attached to the first base portion 30. The first base portion 30 and the second base portion 32 are hard rigid members constructed of a suitable material such as a hard plastic or a lightweight metal. In the illustrated embodiment, the first base portion 30 is attached to the second base portion 32 by a snap-fit connection 34. In particular, the snap-fit connection 34 includes a plurality of tabs 36 provided to the first base portion 30 and a plurality of openings 38 provided to the second base portion 32. However, the base member 14 is not limited to the illustrated construction, but rather can have a variety of configurations as needed and/or desired. In other words, the first base portion 30 and the second base portion 32 can be coupled together in a various ways (e.g., screws).

Basically, the first base portion 30 includes a tubular part 40 rotatably supporting the operating member 16. In the illustrated embodiment, the base member 14 includes a first axial abutment 41 and a second axial abutment 42. In particular, the first base portion 30 includes the first axial abutment 41 and the second base portion 32 includes the second axial abutment 42. The operating member 16 is axially disposed between the first axial abutment 41 and the second axial abutment 42 to restrict axial movement of the operating member 16 relative to the base member 14. The operating member is rotatably supported on the tubular part 40 between the first axial abutment 41 and the second axial abutment 42.

Here, the handlebar mounting structure 18 is attached to the second base portion 32 by the fixing bolt 22. Thus, the second base portion 32 is fixed to the handlebar H via the handlebar mounting structure 18. Also, in the illustrated embodiment, the second base portion 32 includes the cable adjuster 24.

The operating member 16 will now be discussed in more detail with reference mainly to FIGS. 9 to 12. As mentioned above, the operating member 16 is rotatably supported on the base member 14. In particular, the operating member 16 is configured to rotate in a first operating direction D1 about the center axis A. Moreover, the operating member 16 is configured to rotate in a second operating direction D2 about the center axis A. The second operating direction D2 is opposite the first operating direction D1. When the operating member 16 is rotated in the first operating direction D1, the inner wire 12b of the control cable 12 is pull towards the base member 14 to perform a cable pulling operation. In other words, the first operating direction D1 corresponds to a cable pulling direction in the illustrated embodiment. On the other hand, when the operating member 16 is rotated in the second operating direction D2, the inner wire 12b of the control cable 12 is released from the base member 14 to perform a cable releasing operation. In other words, the second operating direction D2 corresponds to a cable releasing direction in the illustrated embodiment.

Figure 12:
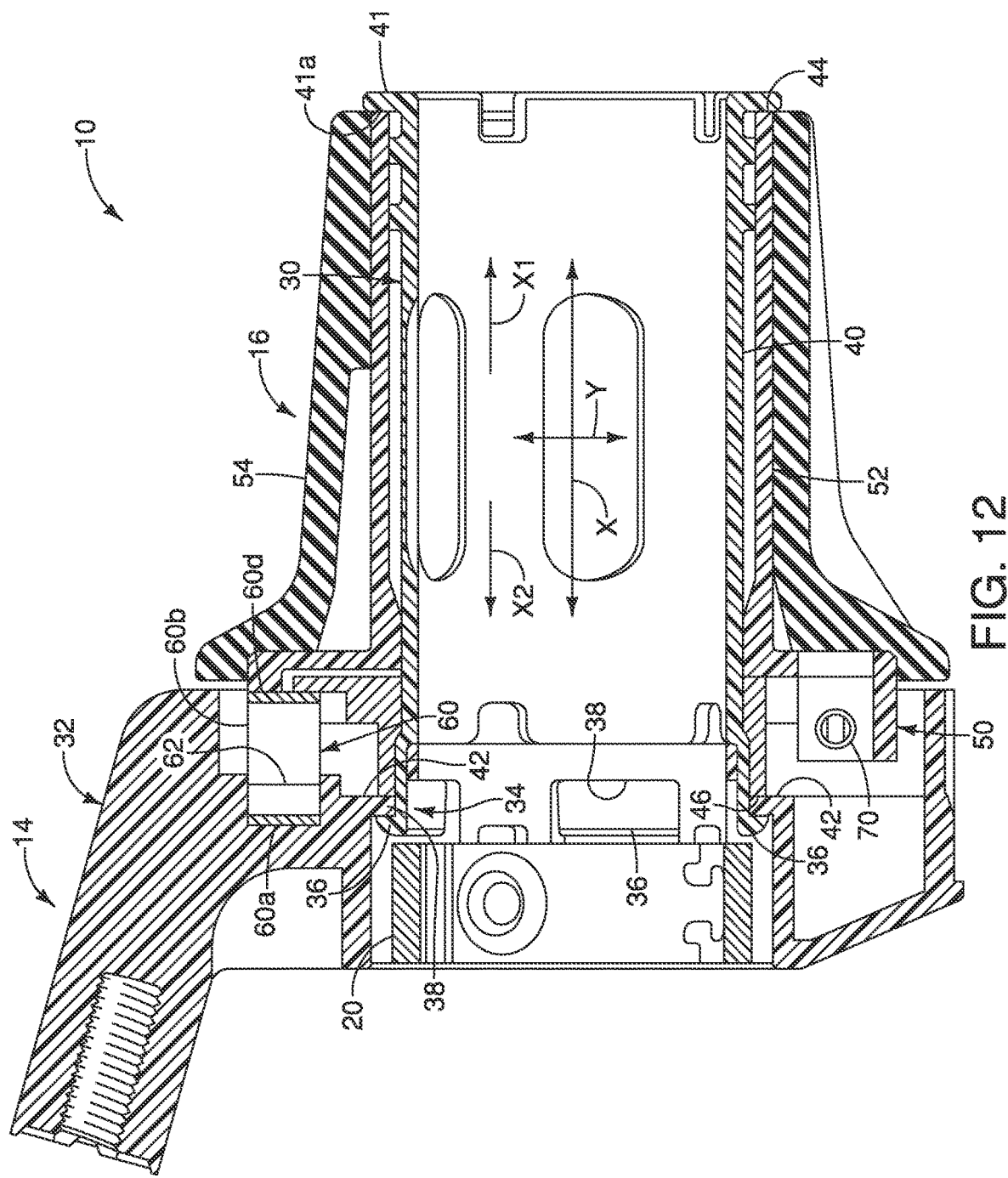
FIG. 12 is a cross sectional view of the operating device illustrated in FIGS. 1 to 7 as view along section line 12-12 of FIG. 4.
Figure 13:
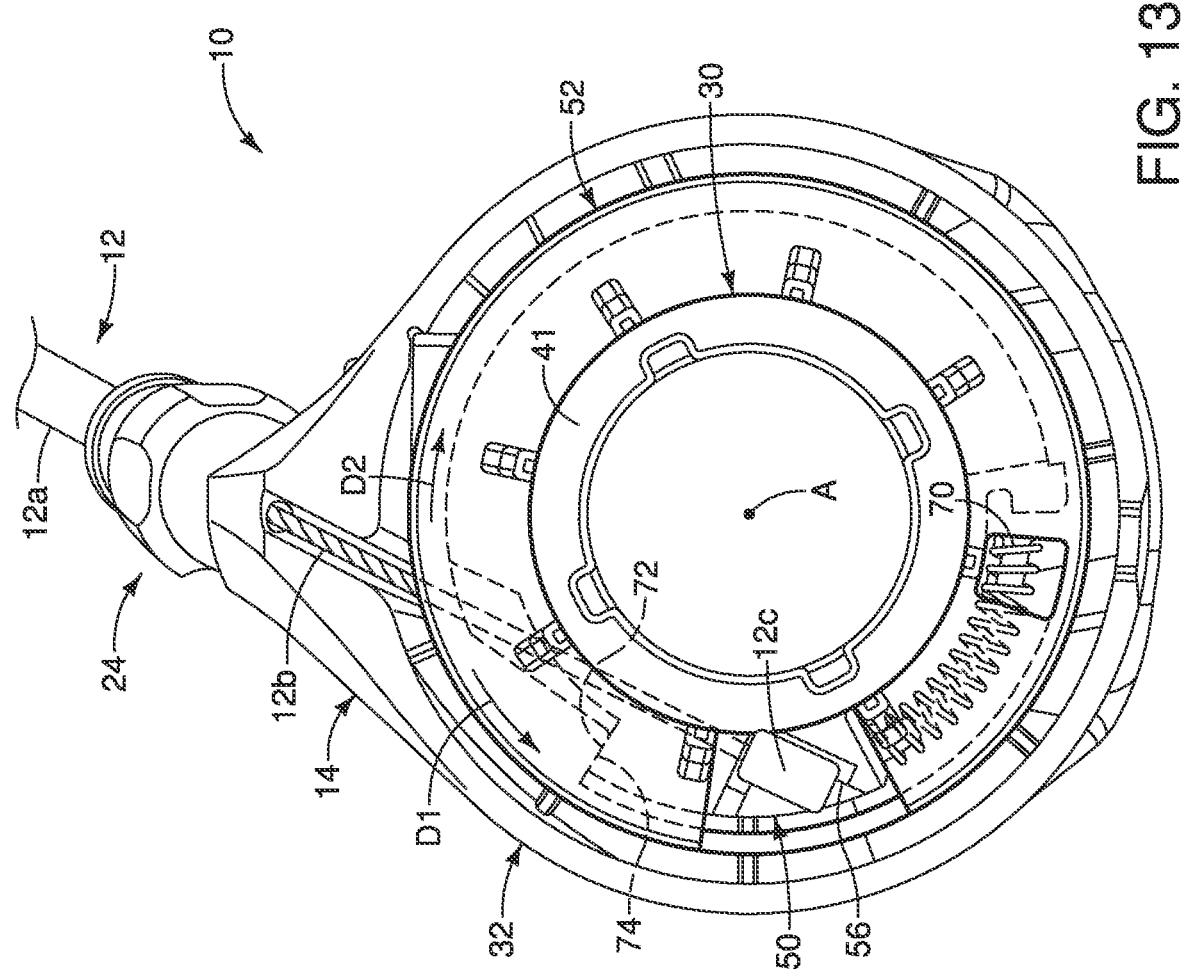
FIG. 13 is an outside end view of the operating device illustrated in FIGS. 1 to 7 in which the grip has been removed.

Moreover, as mentioned above, axial movement of the operating member 16 is restricted relative to the base member 14. Preferably, the operating member 16 does not move in the axial direction X with respect to the base member 14. The axial direction X includes a first axial direction X1 and a second axial direction X2 as seen in FIG. 12. In particular, here, the operating member 16 includes a first contact surface 44. The first contact surface 44 is configured to contact the first axial abutment 41. The operating member 16 includes a second contact surface 46. The second contact surface 46 is configured to contact the second axial abutment 42. In this way, axial movement of the operating member 16 is restricted relative to the base member 14. In the illustrated embodiment, the first axial abutment 41 includes an annular surface 41a. The annular surface 41a of the base member 14 faces in the second axial direction X2 towards the first contact surface 44 of the operating member 16. The first contact surface 44 is also an annular surface that faces in the first axial direction X1 towards the annular surface 41a of the base member 14. In this way, the first contact surface 44 annularly contacts the first axial abutment 41.

In the illustrated embodiment, the operating member 16 basically includes a rotating body 50 and a grip body 52. The rotating body 50 and the grip body 52 are rotatably supported on the tubular part 40. Basically, the rotating body 50 and the grip body 52 are disposed adjacent to each other in the axial direction X on the tubular part 40. Here, the operating member 16 further includes a hand grip 54. The hand grip 54 is constructed of an elastomeric material. The hand grip 54 is disposed on the grip body 52 to provide the user with a more comfortable grip of the operating member 16.

As mentioned above, in the illustrated embodiment, the operating member 16 is configured to selectively pull and release the inner wire 12b of the control cable 12 in response to a rotation movement of the operating member 16 with respect to the base member 14. In the illustrated embodiment, the rotating body 50 includes a cable attachment structure 56. The cable attachment structure 56 is configured to engage a nipple 12c that is attached to the inner wire 12b of the control cable 12. In this way, the inner wire 12b of the control cable 12 is attached to the rotating body 50. Thus, when the rotating body 50 is rotated in the first operating direction D1, the inner wire 12b of the control cable 12 is pull towards the base member 14 to perform a cable pulling operation. On the other hand, when the rotating body 50 is rotated in the second operating direction D2, the inner wire 12b of the control cable 12 is released from the base member 14 to perform a cable releasing operation.

In the illustrated embodiment, the operating device 10 further comprises a biasing member 60. Basically, the biasing member 60 biases the operating member 16 in a direction that is non-perpendicular to the axial direction X. Here, the biasing member 60 biases the operating member 16 in a direction that is parallel to the axial direction X, or substantially parallel to the axial direction X. The biasing member 60 is also configured to engage the base member 14 and the operating member 16 to selectively establish a plurality of predetermined positions of the operating member 16 relative to the base member 14. In other words, the operating member 16 can be temporarily maintained in any one of the predetermined positions by the biasing member 60. In the case where the operating device 10 functions as a shifter for changing a gear position of a transmission device (e.g., a derailleur), the predetermined positions can be referred to as predetermined shift positions.

In the illustrated embodiment, the biasing member 60 is attached to the base member 14. For example, the biasing member 60 is attached to the base member 14 by a fastener 62. Here, the fastener 62 is a pin that is frictionally retained in a hole 32a of the second base portion 32. More specifically, in the illustrated embodiment, the biasing member 60 is a leaf spring. The fastener 62 is preferably configured to stop the biasing member 60 from tilting during operation of the operating member 16. The biasing member 60 has a first leg portion 60a, a second leg portion 60b and a curved connecting portion 60c. The curved connecting portion 60c connects the first leg portion 60a and the second leg portion 60b. Preferably, the biasing member 60 is a one-piece member made of a suitable material such as a metallic material. The curved connecting portion 60c is configured to resiliently flex such that the second leg portion 60b can move towards the first leg portion 60a during operation of the operating member 16. Here, the first leg portion 60a of the biasing member 60 is disposed in a recess 32b of the second base portion 32. The fastener 62 retains the first leg portion 60a of the biasing member 60 in the recess 32b. Thus, during operation of the operating member 16, the second leg portion 60b is moved towards the first leg portion 60a due bending of the connecting portion 60c.

In the illustrated embodiment, the operating member 16 includes a plurality of positioning abutments 64. Here, the positioning abutments 64 are provided on the rotating body 50. The positioning abutments 64 are circumferentially arranged on the rotating body 50 with respect to the center axis A. The rotating body 50 of the operating member 16 further includes a plurality of ramps 66. One of the ramps 66 is associated with one of the positioning abutments 64 to form a plurality of ratchet teeth 68. The biasing member 60 is configured to selectively engage the positioning abutments 64. Specifically, here, the biasing member 60 is a leaf spring having a detent portion 60d configured to selectively engage the positioning abutments 64. The detent portion 60d is a curved portion at the free end of the second leg portion 60b. The detent portion 60d has a generally V-shape in which an apex of the V-shape is configured to selectively engage the positioning abutments 64 to selectively establish the predetermined positions of the operating member 16.

The ramps 66 are configured so that the detent portion 60d can be moved from one of the positioning abutments 64 to the next adjacent one of the positioning abutments 64 when the rotating body 50 is rotated in the first operating direction D1. Moreover, the rotating body 50 and the grip body 52 are configured to move together in response to the operating member 16 being moved in the first operating direction D1 about the center axis A. In other words, the rotating body 50 and the grip body 52 are rotate together in the first operating direction D1 causing the detent portion 60d to be ratcheted over the ratchet teeth 68. On the other hand, the positioning abutments 64 and the ramps 66 are configured so that the detent portion 60d prevents the rotating body 50 and the grip body 52 from simply rotating in the second operating direction D2.

In particular, the grip body 52 is configured to move relative the rotating body 50 in response to the operating member 16 being moved in the second operating direction D2 about the center axis A. Specifically, the operating member 16 includes an additional biasing member 70. The additional biasing member 70 is disposed between the grip body 52 and the rotating body 50 to bias the rotating body 50 in the second operating direction D2 relative to the grip body 52. Here, for example, the additional biasing member 70 is a compression spring. The additional biasing member 70 maintains the grip body 52 in a rest position relative to the rotating body 50 where the operating member 16 is in a rest position. More specifically, the rotating body 50 includes a first stop surface 72, and the grip body 52 includes a second stop surface 74. The additional biasing member 70 biases the rotating body 50 so as to bring the first stop surface 72 into contact with the second stop surface 74 in a state where the operating member 16 is in the rest position. In this way, inadvertent movement of the rotating body 50 is prevented when the grip body 52 is moved less than a predetermined amount in the second operating direction D2 about the center axis A.

The term "rest position" as used herein refers to a state in which a movable part (e.g., the operating member 16) remains stationary without the need of a user or other external force intervening (e.g., holding the operating member 16) to establish a state corresponding to the rest position. Thus, the term "rest position" can also be referred to as a non-operated position or a neutral position. The terms "operated position" and "actuated position" as used herein refer to a position at which the movable part has been moved by the user from a rest position.

Figure 14:
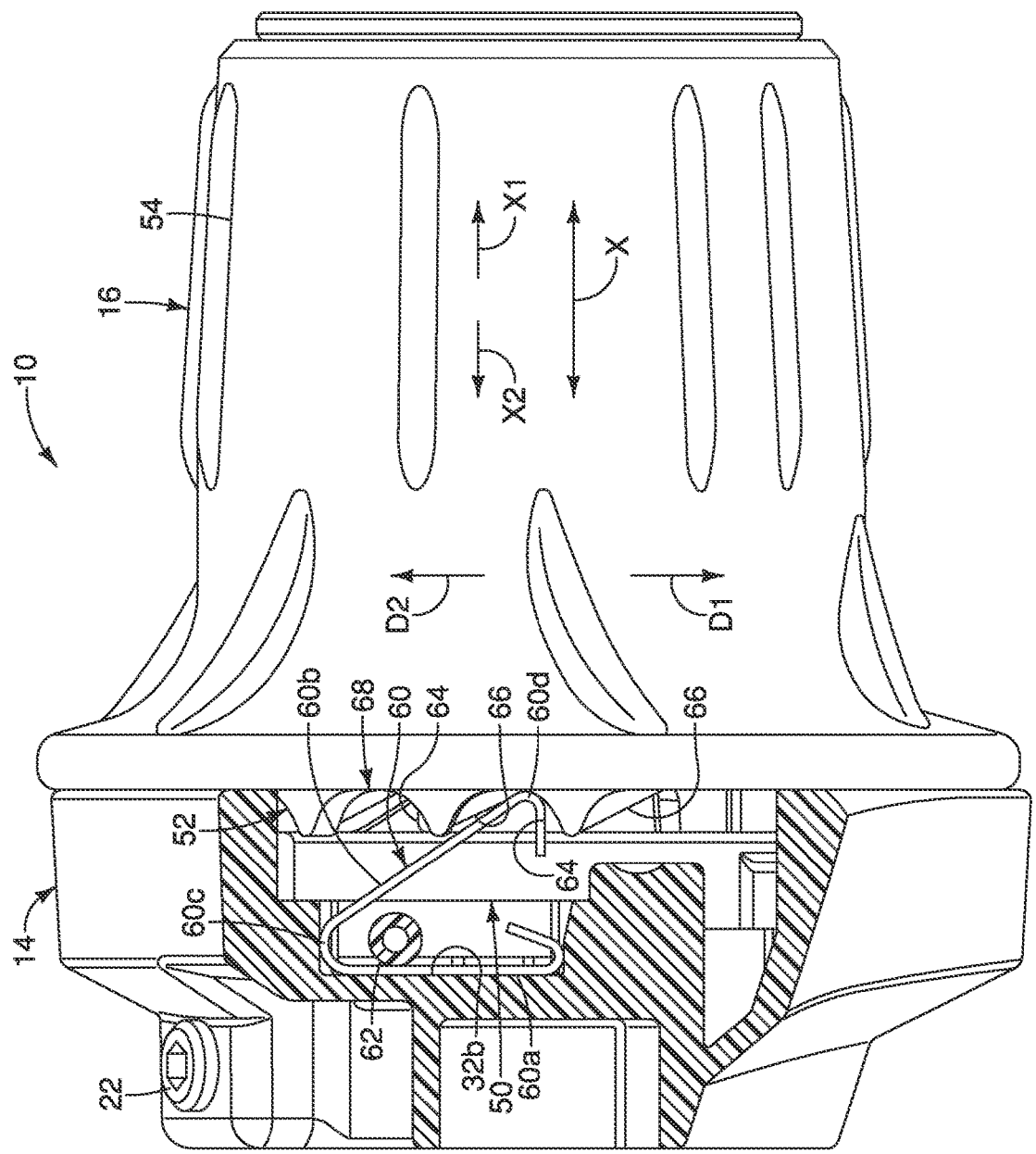
FIG. 14 is an enlarged front view of the operating device illustrated in FIGS. 1 to 7 in which a portion of the base member is broken way to illustrate a first rest position of the operating device in which the cable has been fully released.
Figure 16:
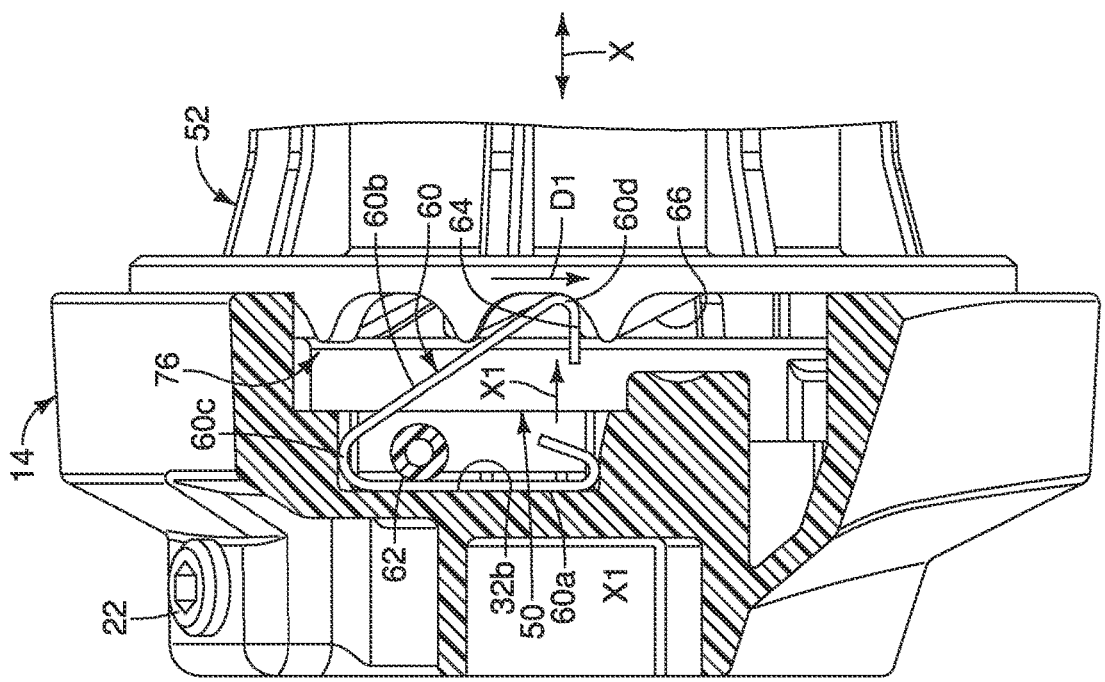
FIG. 16 is an enlarged front view, similar to FIGS. 14 and 15, of the operating device illustrated in FIGS. 1 to 7 in which a portion of the base member is broken way to illustrate a second rest position in which the cable has been moved one position in the cable pulling direction.
Figure 15:
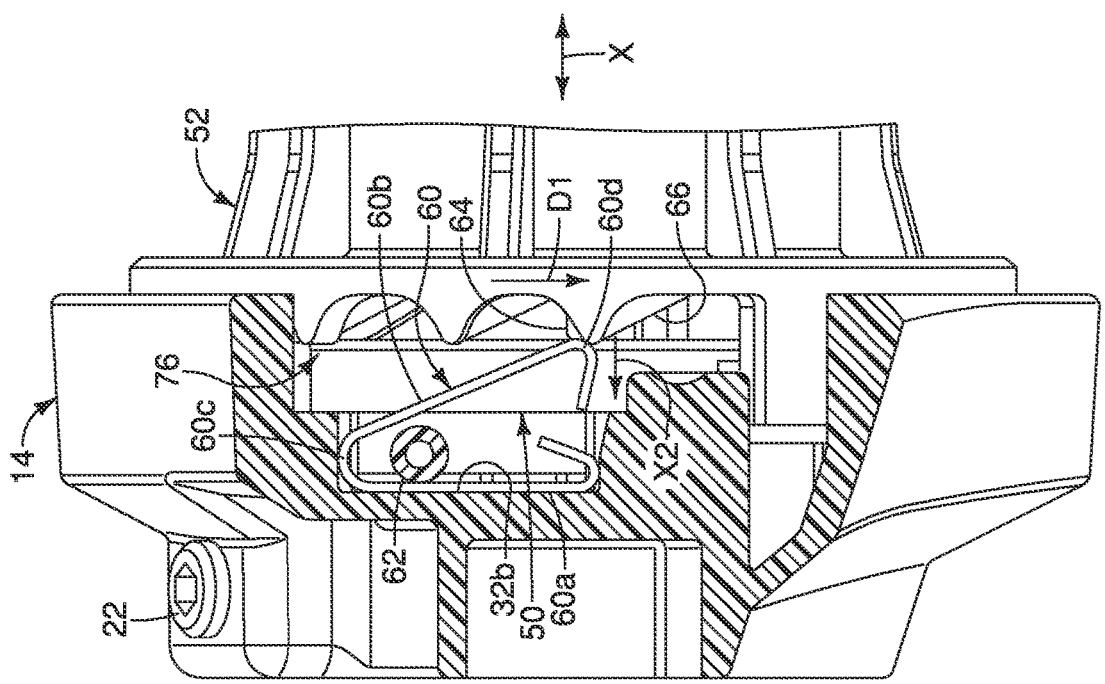
FIG. 15 is an enlarged front view, similar to FIG. 14, of the operating device illustrated in FIGS. 1 to 7 in which a portion of the base member is broken way to illustrate the grip body and the rotating body moving together in the cable pulling direction from the first rest position of FIG. 14.

Referring to FIGS. 14 to 16, a cable pulling operation is illustrated. Here, the detent portion 60d is configured to ratchet over the ratchet teeth 68 as the grip body 52 is rotated in the first operating direction D1. As mentioned above, the rotating body 50 and the grip body 52 rotate together when the grip body 52 is rotated in the first operating direction D1. As seen in FIG. 14, the detent portion 60d of the biasing member 60 contacts one of the positioning abutments 64 to maintain the rotating body 50 and the grip body 52 in their rest positions. As seen in FIG. 15, the rotating body 50 and the grip body 52 are rotated together in the first operating direction D1 such that the detent portion 60d of the biasing member 60 engages one of the cam surfaces 76a of the release profile 76 and is deflected in the second axial direction X2. As seen in FIG. 16, the detent portion 60d of the biasing member 60 rides over the previously engaged one of the positioning abutments 64 such that the detent portion 60d of the biasing member 60 moves in the first axial direction X1. Thus, in FIG. 16, the rotating body 50 and the grip body 52 now move together in the first operating direction D1 and the detent portion 60d contacts the next adjacent one of the positioning abutments 64.

Figure 17:
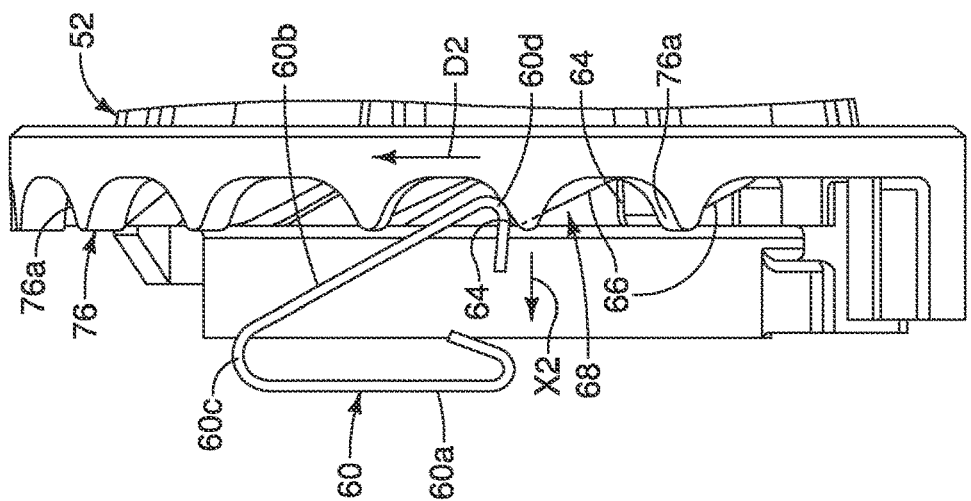
FIG. 17 is a partial side elevational view of the biasing member, the grip body and the rotating body of the operating device illustrated in FIGS. 1 to 7 in which the grip body and the rotating body are in a rest position.
Figure 18:
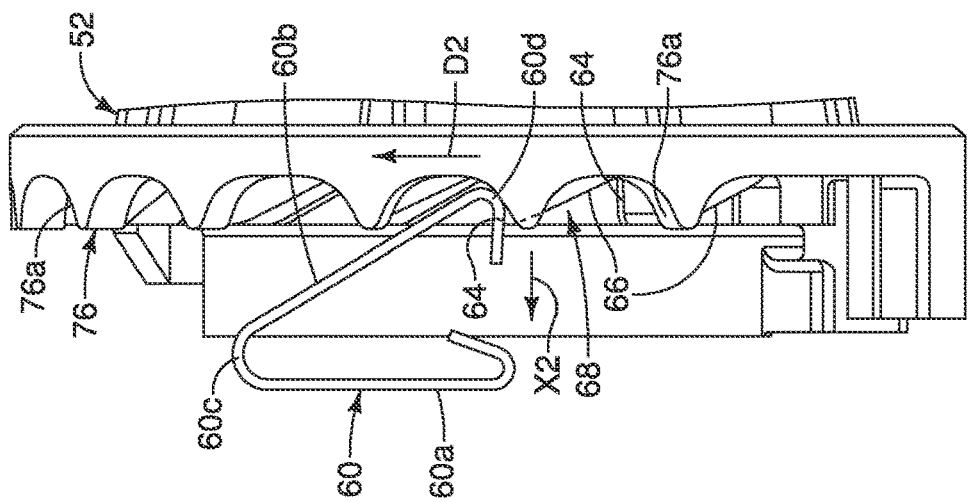
FIG. 18 is a partial side elevational view, similar to FIG. 17, of the biasing member, the grip body and the rotating body, but in which the grip body has been rotated relative to the rotating body from the rest position of FIG. 17 in the second operating direction to start a cable releasing operation.
Figure 19:
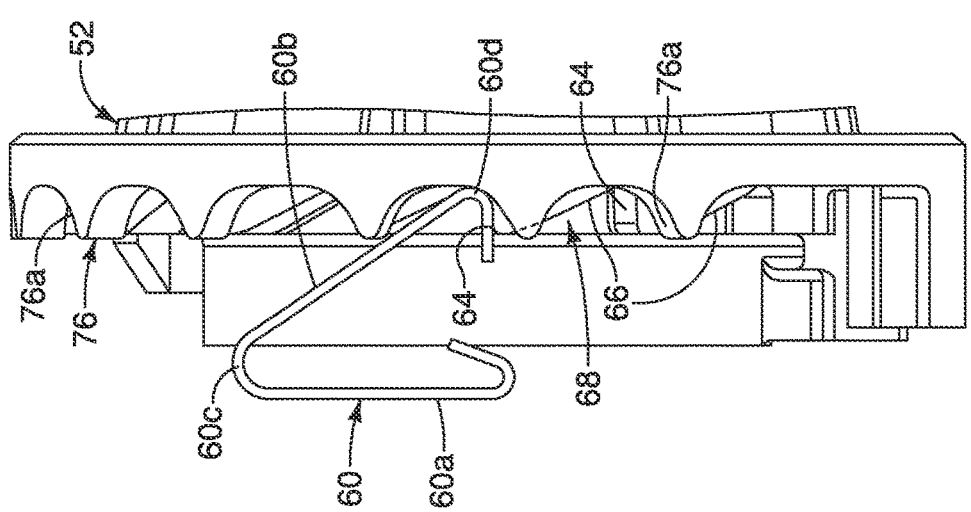
FIG. 19 is a partial side elevational view, similar to FIGS. 17 and 18, of the biasing member, the grip body and the rotating body, but in which the grip body has been rotated further relative to the rotating body from the position of FIG. 18 in the second operating direction in performing the cable releasing operation.

Referring to FIGS. 17 to 23, a cable releasing operation is illustrated. Here, the grip body 52 is moved in the second operating direction D2 to perform the cable releasing operation. In particular, the grip body 52 includes a release profile 76. The release profile 76 is configured to deflect the biasing member 60 in the axial direction X (i.e., the second axial direction X2 in this embodiment) for disengaging the biasing member 60 from the positioning abutments 64 during relative movement of the grip body 52 relative the rotating body 50 in response to the grip body 52 being moved in the second operating direction D2. Here, the release profile 76 includes a plurality of cam surfaces 76a. In FIG. 17, the detent portion 60d of the biasing member 60 contacts one of the positioning abutments 64 and the release profile 76 of the rotating body 50 to maintain the rotating body 50 and the grip body 52 in their rest positions. In FIGS. 18 to 20, the grip body 52 is rotated in relative the rotating body 50 in the second operating direction D2 against the force of the additional biasing member 70 such that the detent portion 60d of the biasing member 60 engages one of the cam surfaces 76a of the release profile 76 and is deflected in the second axial direction X2. In FIGS. 21 to 23, the detent portion 60d of the biasing member 60 rides over the previously engaged one of the positioning abutments 64 and the previously engaged one of the cam surfaces 76a such that the detent portion 60d of the biasing member 60 moves in the first axial direction X1. Thus, in FIGS. 21 to 23, the force of the additional biasing member 70 causes the rotating body 50 to rotate in the second operating direction D2 and the detent portion 60d contacts the next adjacent one of the positioning abutments 64.

Figure 24:
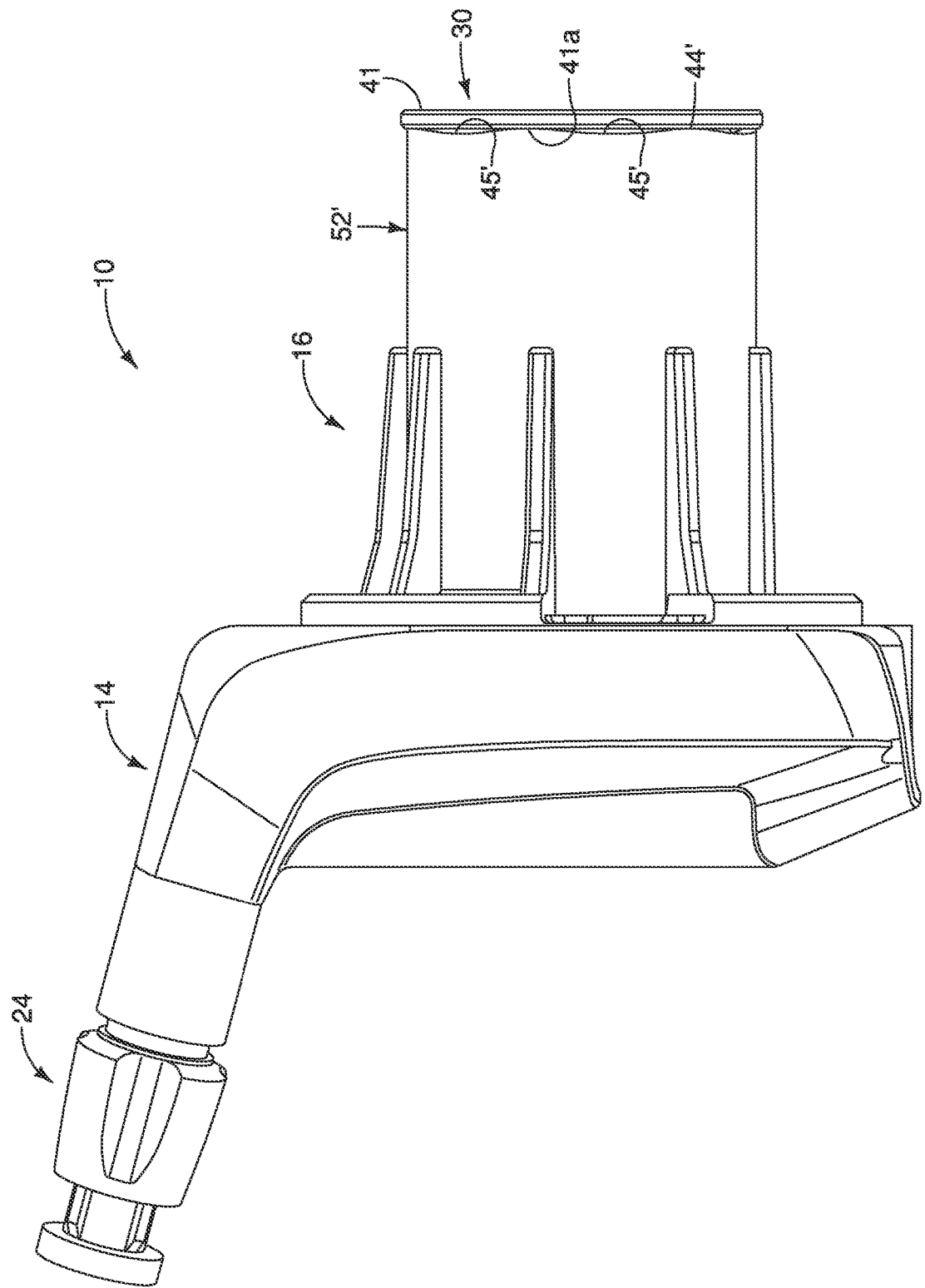
FIG. 24 is a top view of an operating device in accordance with a second embodiment.
Figure 25:
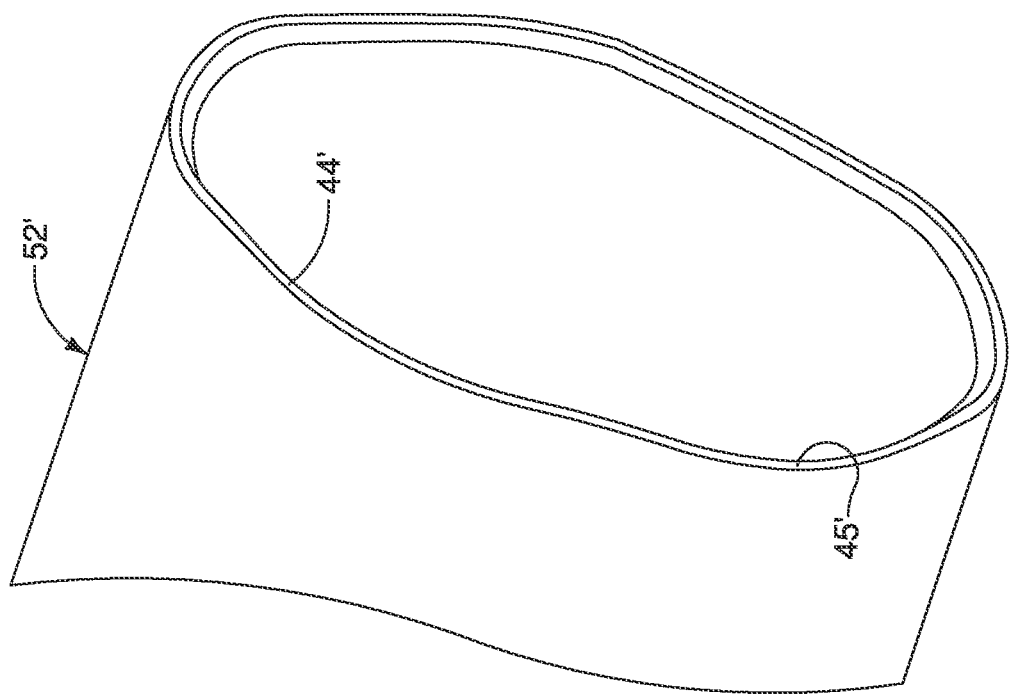
FIG. 25 is an enlarged perspective view of a portion of a grip body of the operating device illustrated in FIG. 24 in accordance with a first modification.

Referring now to FIGS. 24 and 25, a first modification of the operating device 10 will now be explained. Here, in the first modification, the operating device 10 is the same as the first embodiment, except that the grip body 52 has been replaced with a grip body 52'. The grip body 52' is identical to the grip body 52, except that the first contact surface 44 of the grip body 52 has been modified to a first contact surface 44' in the grip body 52'. Here, the first contact surface 44' in an annular surface that includes a wave shape. The annular surface of the first contact surface 44' includes a plurality of sections 45' that do not contact the annular surface 41a of the first axial abutment 41. Thus, the first contact surface 44' intermittently contacts the first axial abutment 41. In this way, the friction between the annular surface 41a of the first axial abutment 41 and the first contact surface 44' can be reduced. Alternatively, the first base portion 30 of the operating device 10 can be modified such that the annular surface 41a of the first axial abutment 41 can includes a wave shape having a plurality of sections, and the first contact surface 44 of the grip body 52 can be shaped as in the first embodiment. In this alternative modification of the first base portion 30, the sections of the wave shape do not contact the first contact surface 44 of the grip body 52. Accordingly, in these modifications, friction between the first axial abutment and the first contact surface is reduced. Thus, in order to reduce friction between the first axial abutment and the first contact surface, at least one of the first axial abutment and the first contact surface includes a wave shape.

Figure 26:
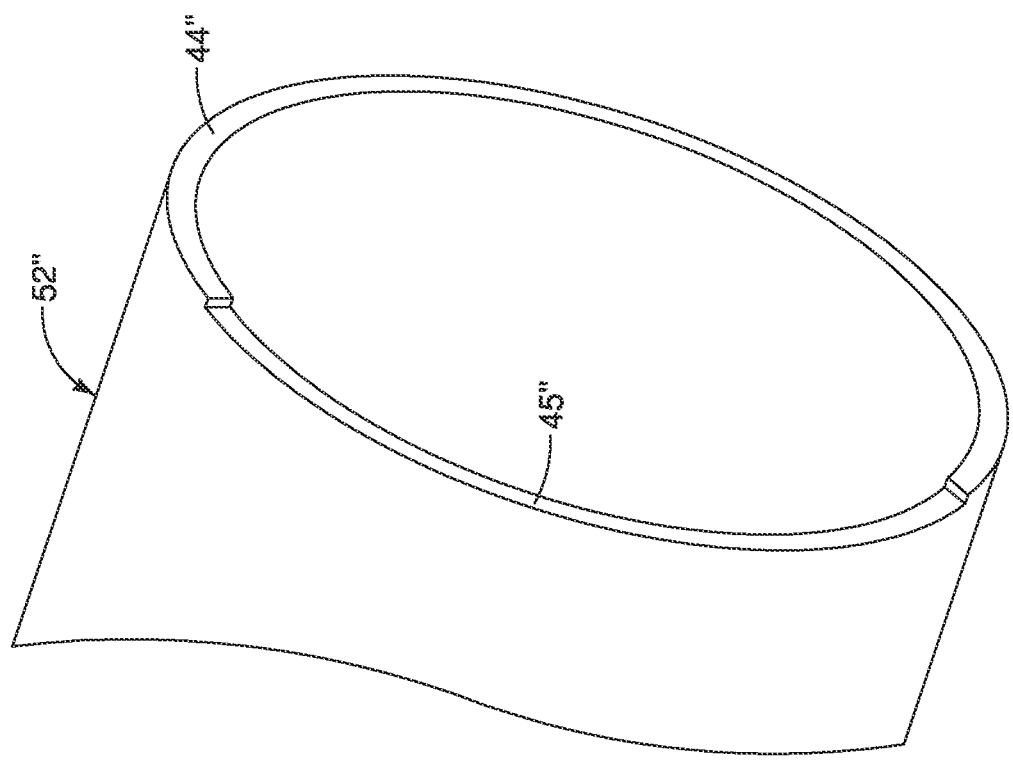
FIG. 26 is an enlarged perspective view of a portion of a grip body in accordance with another modification.

Referring now to FIG. 26, another modification of the operating device 10 will now be explained. Here, in this modification, the operating device 10 is the same as the first embodiment, except that the grip body 52 has been replaced with a grip body 52". The grip body 52" is identical to the grip body 52, except that the first contact surface 44 of the grip body 52 has been modified to a first contact surface 44" in the grip body 52". Here, the first contact surface 44" in an annular surface that includes a recess section 45". The recess section 45" is configured such that the recess section 45" does not contact the annular surface 41a of the first axial abutment 41. Thus, the first contact surface 44" contacts less than 360 degrees of the annular surface 41a of the first axial abutment 41. In this way, the friction between the annular surface 41a of the first axial abutment 41 and the first contact surface 44" can be reduced similar to the modifications mentioned above.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section,"

"portion," "member" or "element" when used in the singular can have the dual meaning of a single part or a plurality of parts unless otherwise stated.

As used herein, the following directional terms "frame facing side", "non-frame facing side", "forward", "rearward", "front", "rear", "up", "down", "above", "below", "upward", "downward", "top", "bottom", "side", "vertical", "horizontal", "perpendicular" and "transverse" as well as any other similar directional terms refer to those directions of a human-powered vehicle (e.g., bicycle) in an upright, riding position and equipped with the operating device. Accordingly, these directional terms, as utilized to describe the operating device should be interpreted relative to a human-powered vehicle (e.g., bicycle) in an upright riding position on a horizontal surface and that is equipped with the operating device. The terms "left" and "right" are used to indicate the "right" when referencing from the right side as viewed from the rear of the human-powered vehicle (e.g., bicycle), and the "left" when referencing from the left side as viewed from the rear of the human-powered vehicle (e.g., bicycle).

The phrase "at least one of" as used in this disclosure means "one or more" of a desired choice. For one example, the phrase "at least one of" as used in this disclosure means "only one single choice" or "both of two choices" if the number of its choices is two. For another example, the phrase "at least one of" as used in this disclosure means "only one single choice" or "any combination of equal to or more than two choices" if the number of its choices is equal to or more than three. Also, the term "and/or" as used in this disclosure means "either one or both of". For instance, the phrase "at least one of A and B" encompasses (1) A alone, (2), B alone, and (3) both A and B. The phrase "at least one of A, B, and C" encompasses (1) A alone, (2), B alone, (3) C alone, (4) both A and B, (5) both B and C, (6) both A and C, and (7) all A, B, and C. In other words, the phrase "at least one of A and B" does not mean "at least one of A and at least one of B" in this disclosure.

Also, it will be understood that although the terms "first" and "second" may be used herein to describe various components, these components should not be limited by these terms. These terms are only used to distinguish one component from another. Thus, for example, a first component discussed above could be termed a second component and vice versa without departing from the teachings of the present invention.

The term "attached" or "attaching", as used herein, encompasses configurations in which an element is directly secured to another element by affixing the element directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "mounted", "bonded", "fixed" and their derivatives. Finally, terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. An operating device for a human-powered vehicle, the operating device comprising:
   a base member configured to be provided to a handlebar and having a center axis defining an axial direction and a radial direction;
   an operating member configured to rotate relative to the base member about the center axis; and
   a biasing member biasing the operating member in a direction that is non-perpendicular to the axial direction,
   the operating member including a plurality of positioning abutments, the biasing member being configured to selectively engage the positioning abutments such that the biasing member contacts the positioning abutments directly.

2. The operating device according to claim 1, wherein the biasing member is attached to the base member.

3. The operating device according to claim 1, wherein the base member includes a first axial abutment and a second axial abutment, and
   the operating member is axially disposed between the first axial abutment and the second axial abutment to restrict axial movement of the operating member relative to the base member.

4. The operating device according to claim 3, wherein the operating member includes a first contact surface configured to contact the first axial abutment, and
   the first axial abutment includes an annular surface and the first contact surface annularly contacts the first axial abutment.

5. The operating device according to claim 4, wherein at least one of the annular surface of the first axial abutment and the first contact surface has a shape such that a portion of the first contact surface contacts the first axial abutment and a portion of the first contact surface does not contact the first axial abutment.

6. The operating device according to claim 4, wherein the first axial abutment includes an annular surface and the first contact surface contacts less than 360 degrees of the annular surface of the first axial abutment.

7. The operating device according to claim 4, wherein at least one of the first axial abutment and the first contact surface includes a wave shape.

8. The operating device according to claim 1, wherein the base member includes a first base portion and a second base portion attached to the first base portion.

9. The operating device according to claim 8, wherein the first base portion includes a tubular part rotatably supporting the operating member.

10. The operating device according to claim 8, wherein the first base portion includes a first axial abutment and the second base portion includes a second axial abutment, the operating member is axially disposed between the first axial abutment and the second axial abutment to restrict axial movement of the operating member relative to the base member.

11. The operating device according to claim 8, wherein the first base portion is attached to the second base portion by a snap-fit connection.

12. The operating device according to claim 8, wherein the second base portion includes a cable adjuster.

13. The operating device according to claim 1, wherein the operating member includes a rotating body and a grip body.

14. The operating device according to claim 13, wherein the operating member further includes a hand grip constructed of an elastomeric material.

15. The operating device according to claim 13, wherein the rotating body includes a cable attachment structure.

16. The operating device according to claim 13, wherein the rotating body and the grip body are configured to move together in response to the operating member being moved in a first operating direction about the center axis.

17. The operating device according to claim 16, wherein the grip body is configured to move relative to the rotating body in response to the operating member being moved in a second operating direction about the center axis where the second operating direction is opposite the first operating direction.

18. The operating device according to claim 17, wherein the positioning abutments are circumferentially arranged on the rotating body with respect to the center axis, and the grip body includes a release profile configured to deflect the biasing member in the axial direction during movement of the grip body relative to the rotating body in response to the operating member being moved in the second operating direction.

19. The operating device according to claim 1, wherein the base member includes a handlebar mounting structure.

20. The operating device according to claim 1, wherein the biasing member having a detent portion configured to contact one of the positioning abutments when the biasing member is selectively engaged with the one of the positioning abutments.

21. An operating device for a human-powered vehicle, the operating device comprising:
- a base member configured to be provided to a handlebar and having a center axis defining an axial direction and a radial direction;
- an operating member configured to rotate relative to the base member about the center axis, the operating member including a rotating body and a grip body; and
- a biasing member biasing the operating member in a direction that is non-perpendicular to the axial direction,
- the operating member including a plurality of positioning abutments, the biasing member being configured to selectively engage the positioning abutments,
- the rotating body and the grip body being configured to move together in response to the operating member being moved in a first operating direction about the center axis,
- the grip body being configured to move relative the rotating body in response to the operating member being moved in a second operating direction about the center axis where the second operating direction is opposite the first operating direction,
- the operating member includes an additional biasing member disposed between the grip body and the rotating body to bias the rotating body in the second operating direction relative to the grip body.

22. The operating device according to claim 21, wherein the additional biasing member is a compression spring.

23. The operating device according to claim 21, wherein the rotating body includes a first stop surface, and the grip body includes a second stop surface, the additional biasing member biases the rotating body so as to bring the first stop surface into contact with the second stop surface in a state where the operating member is in a rest position.

24. An operating device for a human-powered vehicle, the operating device comprising:
- a base member configured to be provided to a handlebar and having a center axis defining an axial direction and a radial direction;
- an operating member configured to rotate relative to the base member about the center axis; and
- a leaf spring biasing the operating member in a direction that is non-perpendicular to the axial direction,
- the operating member including a plurality of positioning abutments, the leaf spring being configured to selectively engage the positioning abutments,
- the leaf spring having a detent portion configured to selectively engage the positioning abutments.

* * * * *